United States Patent
Yim et al.

(10) Patent No.: US 9,740,316 B2
(45) Date of Patent: Aug. 22, 2017

(54) MOBILE TERMINAL AND SYSTEM HAVING THE SAME

(71) Applicant: LG ELECTRONICS INC., Seoul (KR)

(72) Inventors: Soyeon Yim, Seoul (KR); Juha Hyun, Seoul (KR); Jungbin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/705,655

(22) Filed: May 6, 2015

(65) Prior Publication Data

US 2016/0085329 A1 Mar. 24, 2016

(30) Foreign Application Priority Data

Sep. 24, 2014 (KR) .................. 10-2014-0127960

(51) Int. Cl.
| | |
|---|---|
| *G06F 3/041* | (2006.01) |
| *G06F 3/01* | (2006.01) |
| *G06F 3/14* | (2006.01) |
| *G06F 21/35* | (2013.01) |
| *H04L 29/06* | (2006.01) |
| *H04W 12/06* | (2009.01) |
| *H04W 12/08* | (2009.01) |
| *H04W 88/02* | (2009.01) |

(52) U.S. Cl.
CPC .............. *G06F 3/041* (2013.01); *G06F 3/011* (2013.01); *G06F 3/017* (2013.01); *G06F 3/1423* (2013.01); *G06F 21/35* (2013.01); *H04L 63/0853* (2013.01); *H04W 12/06* (2013.01); *H04W 12/08* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2014/0325614 A1 | 10/2014 | Rhelimi | |
| 2015/0031348 A1* | 1/2015 | Lee ..................... | H04B 1/385 455/418 |

(Continued)

FOREIGN PATENT DOCUMENTS

| | | |
|---|---|---|
| EP | 2 378 748 A1 | 10/2011 |
| EP | 2 600 319 A1 | 6/2013 |

(Continued)

*Primary Examiner* — Patrick Edouard
*Assistant Examiner* — Maheen Javed
(74) *Attorney, Agent, or Firm* — Birch, Stewart, Kolasch & Birch, LLP

(57) ABSTRACT

A mobile terminal including a touch screen; and a controller configured to control the touch screen to be in an inactive state in which illumination of the touch screen is turned off, convert the touch screen from the inactive state into an active state in which the illumination of the touch screen is turned on, in response to a tap meeting a preset condition being input in the inactive state of the touch screen, and display a first screen on the touch screen when the input tap meeting the preset condition has been input by a user wearing a preset wearable device, and display a second screen different than the first screen when the input tap meeting the preset condition has been input by the user not wearing the preset wearable device.

10 Claims, 22 Drawing Sheets

(56) References Cited

U.S. PATENT DOCUMENTS

2015/0358201 A1* 12/2015 Park .................... H04L 41/0813
715/735
2015/0378595 A1   12/2015 Jung et al.
2016/0013872 A1*  1/2016 Astrand ............... H04B 13/005
455/41.2
2016/0320849 A1* 11/2016 Koo ........................ G06F 3/017

FOREIGN PATENT DOCUMENTS

| KR | 10-1160681 B1 | 6/2012 |
| KR | 10-1404234 B1 | 6/2014 |

* cited by examiner

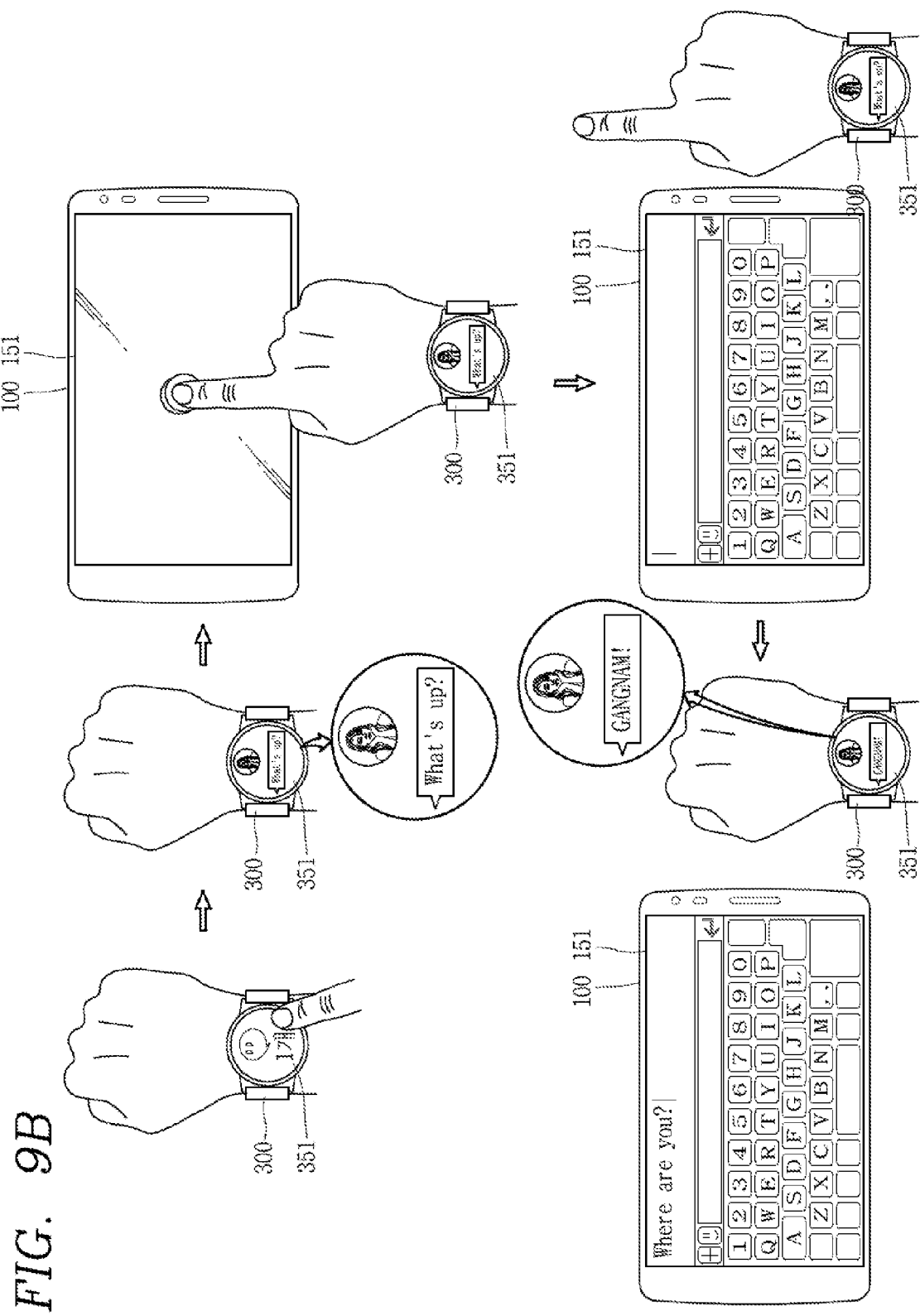

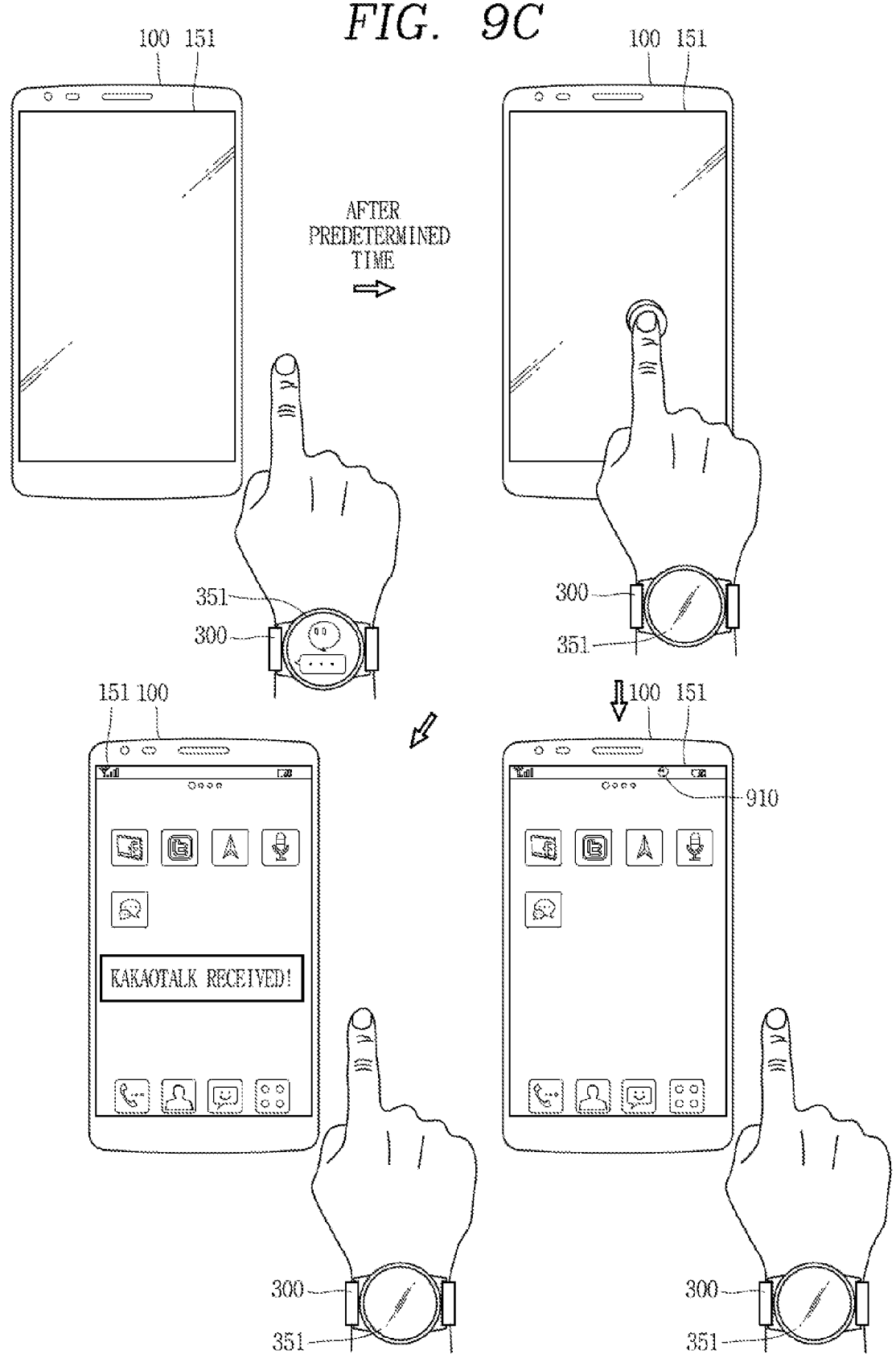

MOBILE TERMINAL AND SYSTEM HAVING THE SAME

CROSS-REFERENCE TO RELATED APPLICATION

Pursuant to 35 U.S.C. §119(a), this application claims the benefit of earlier filing date and right of priority to Korean Application No. 10-2014-0127960, filed on Sep. 24, 2014, the contents of which is incorporated by reference herein in its entirety.

BACKGROUND OF THE DISCLOSURE

1. Field of the Disclosure

This specification relates to a mobile terminal and a wearable device, which are capable of transmitting and receiving data each other when they are located within a reference distance, and a system having the same.

2. Background of the Disclosure

Terminals may be divided into mobile/portable terminals and stationary terminals. Also, the mobile terminals may be classified into handheld terminals and vehicle mount terminals according to whether or not a user can directly carry. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. As it becomes multifunctional, a mobile terminal can capture still images or moving images, play music or video files, play games, receive broadcast and the like, so as to be implemented as an integrated multimedia player.

Meanwhile, in accordance with still further embodiments, a mobile terminal may be configured as a device which is wearable on a human body. Such devices go beyond the usual technique of a user grasping the mobile terminal using his or her hand. Examples of the wearable device include a smart watch, a smart glass, a head mounted display (HMD), and the like. Such wearable device is not independently used but operate in cooperation with a mobile terminal. For example, when a message is received in the mobile terminal, notification information informing of the message reception is output on the wearable device as well as the mobile terminal. To stop the output of the notification information, a user has to apply a separate input with respect to each of the mobile terminal and the wearable device, which is inconvenient.

SUMMARY OF THE DISCLOSURE

Therefore, one aspect of the detailed description is to solve the aforementioned problems and other disadvantages.

Another aspect of the detailed description is to control both the mobile terminal and a preset wearable device by applying an input of tapping an object to a display unit in an inactive state, and a system having the same.

Yet another aspect of the detailed description is to provide a mobile terminal, which easily releases a lock state thereof using a wearable device, which does not require for user authentication upon executing a function because of being worn on a part of the user's body, and a system having the same.

Still another aspect of the detailed description is to provide a mobile terminal, which enables a new type of terminal control, different from the related art, by use of a wearable device, and a system having the same.

Another aspect of the detailed description is to provide a mobile terminal, which simply moves screen information displayed on a wearable device with a relatively small display area to the mobile terminal with a relatively large display area, and a system having the same.

To achieve these and other advantages and in accordance with the purpose of this specification, as embodied and broadly described herein, the present invention provides is provided a mobile terminal including a touch screen including a touch sensor and a display, wherein the display is configured to have a state conversion between an activated state where the display is on and the touch sensor is on, and a deactivated state where the display is off and the touch sensor is on, and a controller that is configured to convert the touch screen from the inactive state into the active state when a tap meeting a preset condition is input in the inactive state of the touch screen, wherein the controller outputs different screen information on the touch screen converted into the active state, according to whether or not the tap meeting the preset condition has been input by a user wearing a preset wearable device.

In accordance with one embodiment disclosed herein, the controller may release or maintain a lock state according to whether or not the tap meeting the preset condition has been input by the user wearing the preset wearable device.

In accordance with one embodiment disclosed herein, the lock state may be released and first screen information may be output on the touch screen converted into the active state when the tap meeting the preset condition has been input by the user wearing the preset wearable device. Also, the lock state may be maintained and second screen information, different from the first screen information, may be output on the touch screen converted into the active state when the tap meeting the preset condition has been input by a user without wearing the preset wearable device.

In accordance with one embodiment disclosed herein, the first screen information may vary according to information which is being output on the wearable device when the tap meeting the preset condition has been input.

In accordance with one embodiment disclosed herein, the information which is being output on the wearable device may be a notification icon notifying an event generated in at least one application, and the first screen information may be an execution screen of the at least one application associated with the event.

In accordance with one embodiment disclosed herein, the first screen information may be a home screen when there is no information which is being output on the wearable device when the tap meeting the preset condition has been input.

In accordance with one embodiment disclosed herein, the second screen information may be a lock screen configured to receive a password which is input for releasing the lock state.

In accordance with one embodiment disclosed herein, the mobile terminal may further include a sensing unit that is configured to sense whether or not the tap applied to the touch screen has been input by the user wearing the preset wearable device.

In accordance with one embodiment disclosed herein, the sensing unit may sense whether or not the tap applied to the touch screen has been input by the user wearing the preset wearable device, based upon a movement of electric charges generated between the mobile terminal and the preset wearable device when the tap has been applied to the touch screen.

In accordance with one embodiment disclosed herein, the mobile terminal may further include a wireless communication unit that is configured to perform communication with the wearable device. The controller may determine that the tap applied to the touch screen has been input by the user wearing the preset wearable device when it receives a notification signal notifying that a preset gesture has been sensed in the wearable device within a predetermined period of time after the input of the tap to the touch screen.

In accordance with one embodiment disclosed herein, the controller may output graphic objects provided to change setting values of the preset wearable device on the touch screen converted into the active state when the tap meeting the preset condition is input by the user wearing the preset wearable device and a touch input generated by the tap meeting the preset condition is maintained without being released.

In accordance with one embodiment disclosed herein, the preset wearable device may be set by the user.

To achieve these and other advantages and in accordance with the purpose of this specification, as embodied and broadly described herein, there is provided a system including a wearable device that is configured to output information related to an event when the event is generated, and a mobile terminal that is provided with a touch screen and configured to display an execution screen of one of functions, which are executable thereon, on the touch screen when a tap meeting a preset condition is input on the touch screen by a user wearing the wearable device. Here, the one of the functions executable on the mobile terminal may be a function linked to information which is being output on the wearable device when the tap meeting the preset condition has been input.

In accordance with one embodiment disclosed herein, an execution screen of an application associated with the event may be displayed on the touch screen when the information which is being output on the wearable device at the moment that the tap meeting the preset condition has been input is a notification icon notifying the event generation.

In accordance with one embodiment disclosed herein, the wearable device may stop the output of the information when the execution screen of the event-associated application is displayed on the touch screen.

In accordance with one embodiment disclosed herein, the mobile terminal may continuously display a video on the touch screen when the information which is being output on the wearable device at the moment that the tap meeting the preset condition has been input is the video.

In accordance with one embodiment disclosed herein, the wearable device may output a graphic object provided to execute a function linked to a reproduction of the video displayed on the touch screen when the video is continuously displayed on the touch screen.

In accordance with one embodiment disclosed herein, the mobile terminal may determine whether or not the tap applied to the touch screen has been input by the user wearing the wearable device, based upon a movement of electric charges generated between the mobile terminal and the wearable device when the tap is applied to the touch screen.

In accordance with one embodiment disclosed herein, the mobile terminal may display a lock screen on the touch screen when the tap meeting the preset condition is input by a user without wearing the wearable device, and the lock screen may be configured to receive a password input for releasing the lock state of the mobile terminal.

In accordance with one embodiment disclosed herein, the tap meeting the preset condition may include first and second taps continuously tapping a predetermined area of the touch screen for a reference time. A sensing unit provided in the wearable device may sense a movement corresponding to the first tap when the first tap has been input on the mobile terminal, and sense a movement corresponding to the second tap when the second tap has been input on the mobile terminal.

In accordance with another embodiment disclosed herein to achieve the above or other advantages, a mobile terminal may include a touch screen that is configured to be configured to be converted from one of an inactive state where a light thereof is turned off and an active state where the light is turned on to the other, and a controller that is configured to convert the touch screen from the inactive state into the active state, and display an execution screen of one of functions executable on the terminal on the touch screen when a preset touch input is applied to the touch screen in the inactive state by a user wearing a preset wearable device. Here, the one of the functions executable on the terminal may be a function linked to information which is being output on the wearable device when the preset touch input has been input. Here, the controller may maintain the inactive state when the touch input is input by a user without wearing the preset wearable device in the inactive state.

A mobile terminal and a control method thereof disclosed herein will provide the following effects. In accordance with at least one of embodiments disclosed herein, when a tap meeting a preset condition is applied by a user wearing a preset wearable device, a lock state may be released even without an input of a separate password, result in providing a new type of user convenience.

Even though the tap meeting the preset condition is applied by the user without wearing the preset wearable device, the lock state can be maintained and a lock screen for allowing an input of a password thereon may be displayed, which may enhance security of the mobile terminal.

In accordance with at least one of embodiments disclosed herein, since the lock state can be released in response to the tap meeting the preset condition being applied and also screen information displayed on a display unit of the mobile terminal can vary according to a state of the wearable device, a user can display information, which is output on the wearable device, on the mobile terminal in a simple, fast manner. This allows the user to simply check desired visual information on a relatively great display area.

In accordance with at least one of embodiments disclosed herein, one of the mobile terminal and the wearable device may display a content and the other may display an interface (or an input method editor (IME)) associated with the content, in response to the tap meeting the preset condition, preventing the content from being obscured by the interface.

In accordance with at least one of embodiments disclosed herein, at least one of the mobile terminal and the wearable device can be controlled according to characteristics (attributes) of the tap meeting the preset condition, so as to provide a new type of user interface, different from the related art.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings:

FIGS. 9A to 9H are conceptual views illustrating an operation implemented by a mobile terminal and a wearable device in a system according to an embodiment of the present disclosure, which illustrates an execution of a different type of control according to a state of the wearable device when a tap input is applied by a main user;

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
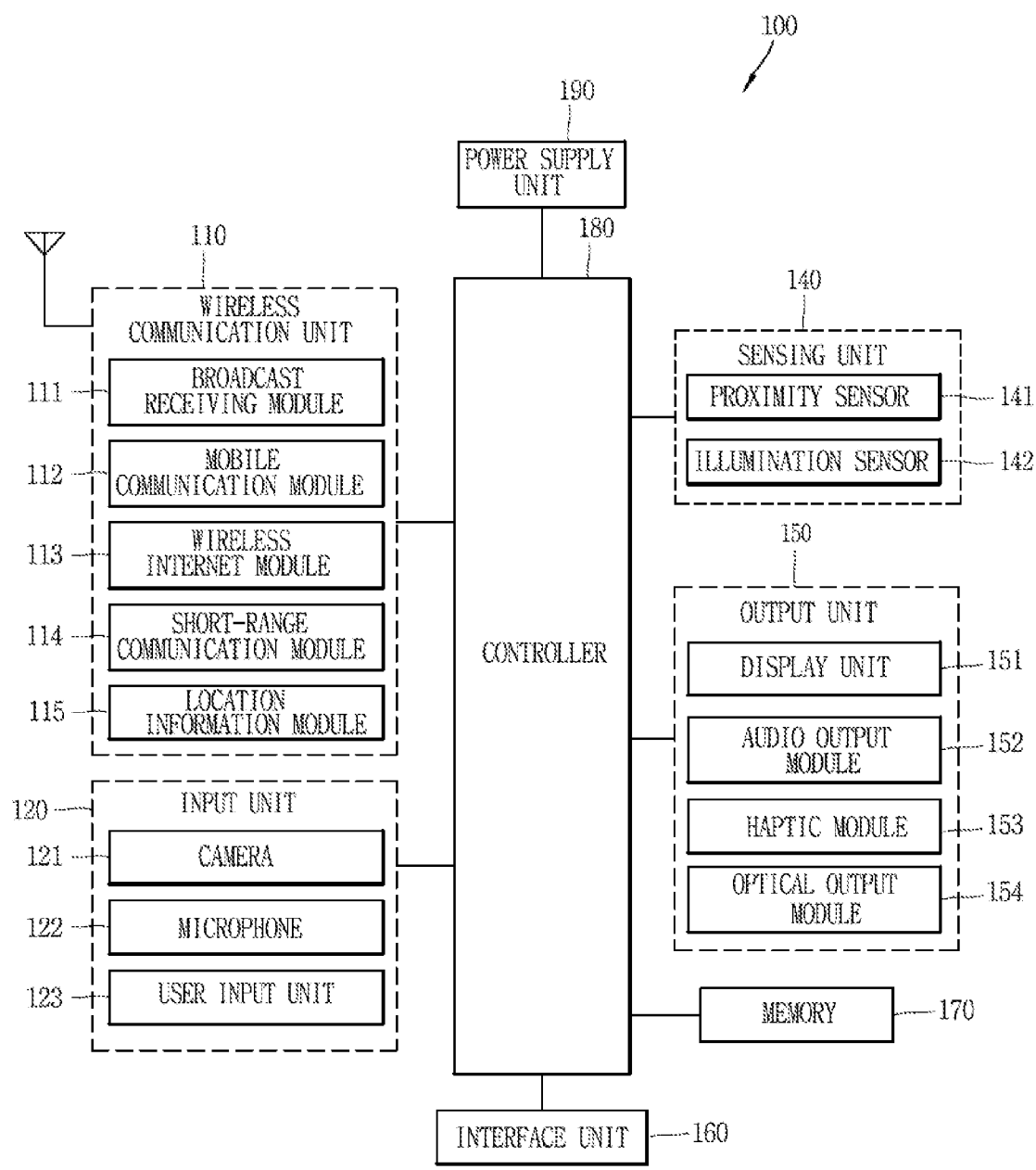
FIG. 1A is a block diagram of a mobile terminal according to an embodiment of the present disclosure.
Figure 1B:
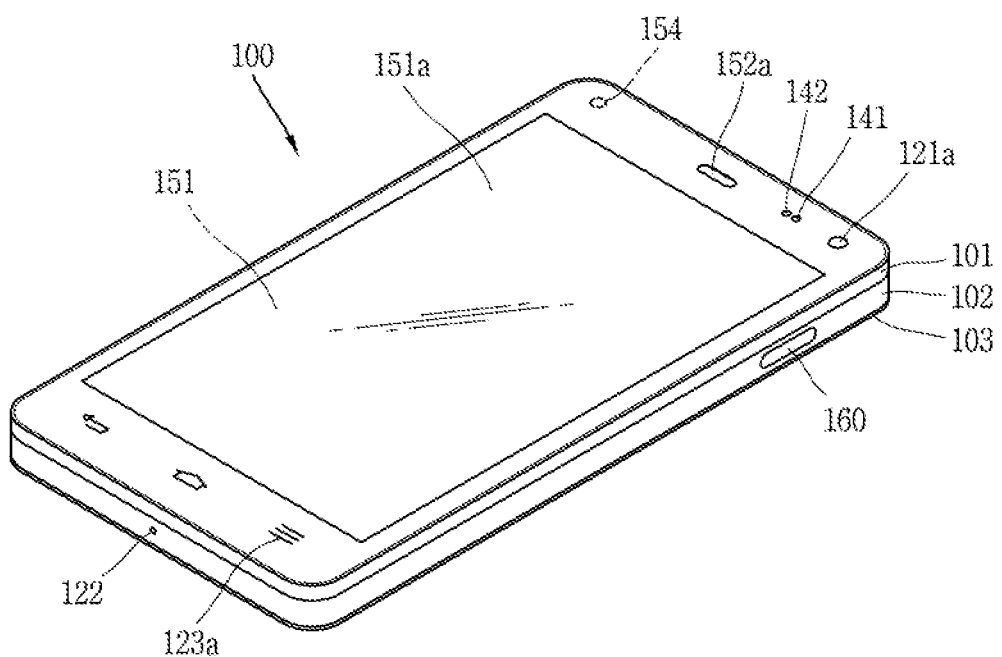
FIGS. 1B and 1C are conceptual views illustrating one example of the mobile terminal, viewed from different directions.
Figure 1C:
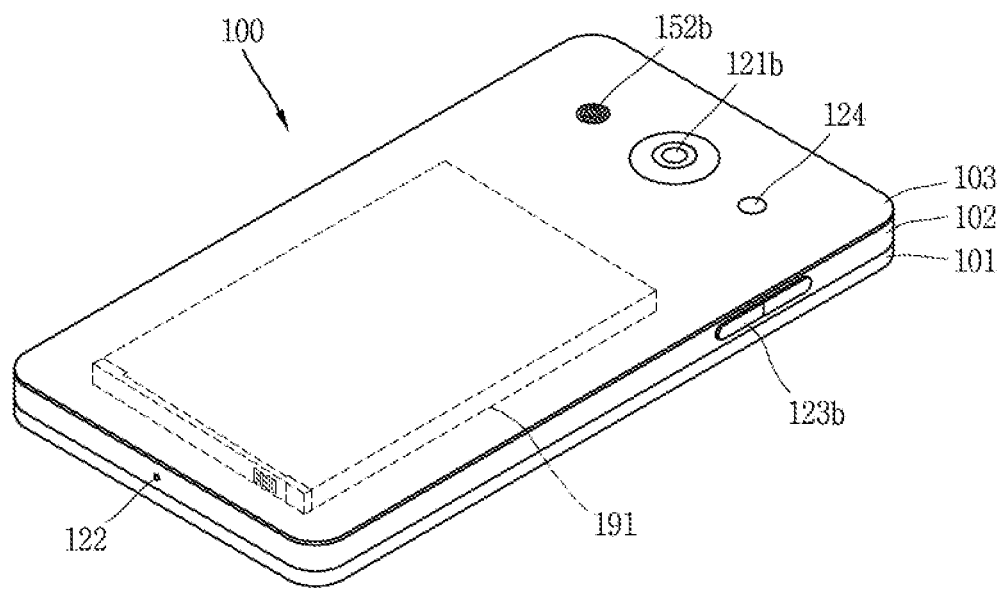

Reference is now made to FIGS. 1A-1C, where FIG. 1A is a block diagram of a mobile terminal according to an embodiment of the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, in FIG. 1A, the sensing unit 140 is shown having. If desired, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well. In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
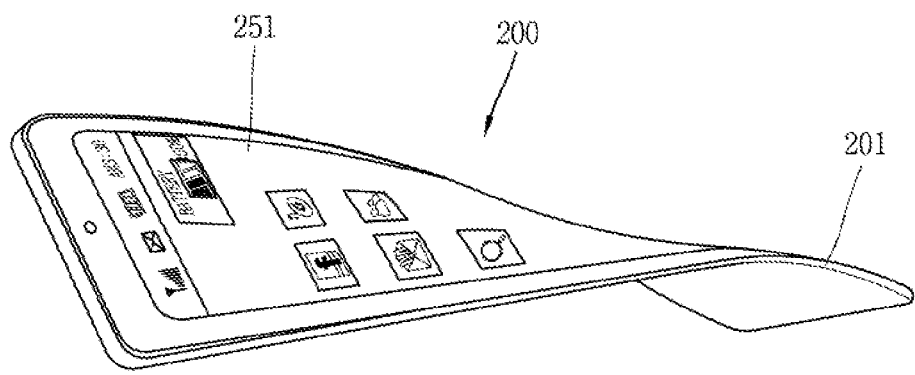
FIG. 2 is conceptual view of a deformable mobile terminal according to an alternative embodiment of the present disclosure.

Meanwhile, an embodiment of the present invention may display information processed therein using a flexible display. Hereinafter, it will be described in more detail with reference to the accompanying drawing. In particular, FIG. 2 is a conceptual view of a deformable mobile terminal 200 according to an alternative embodiment of the present invention.

In this figure, the mobile terminal 200 is shown having a display unit 251, which is a type of display that is deformable by an external force. This deformation, which includes the display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A to 1C.

The flexible display unit of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

Also, the controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

Figure 3A:
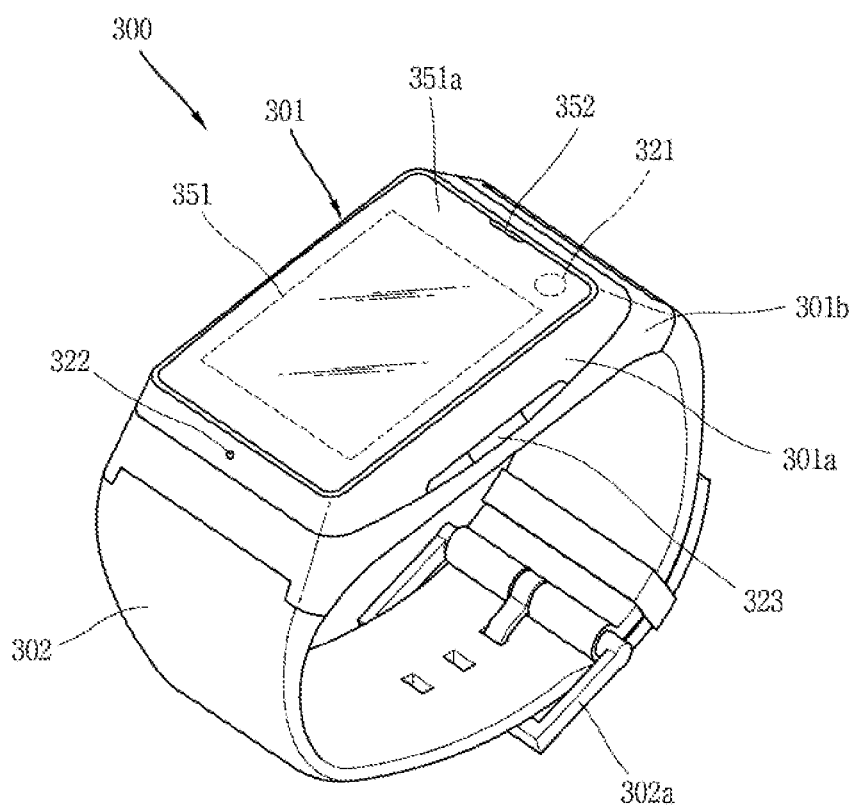
FIGS. 3A and 3B are conceptual views of a watch-type mobile terminal (or a wearable device) according to another alternative embodiment of the present disclosure.
Figure 3B:
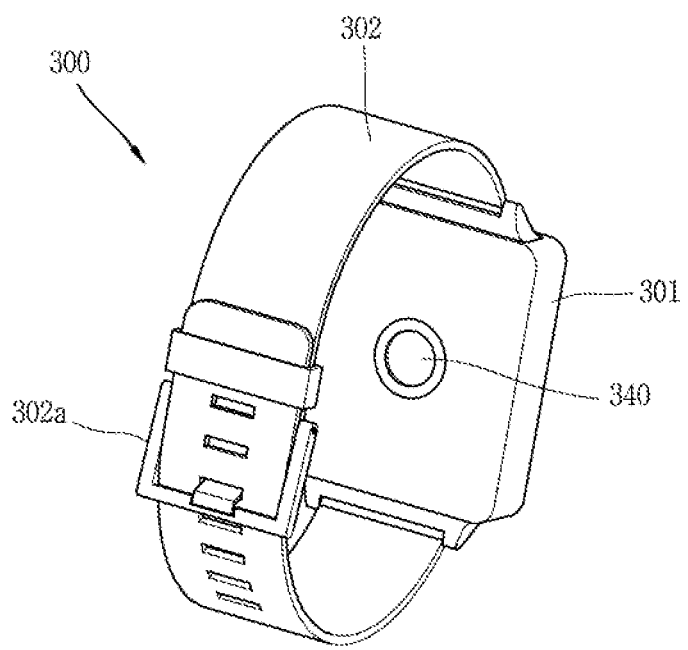

Next, FIGS. 3A and 3B are conceptual views of a watch-type mobile terminal 300 (or a wearable device) according to another alternative embodiment of the present disclosure. As depicted above, the watch-type mobile terminal 300 may be referred to as 'wearable device.' Referring to FIG. 3A, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501. The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

As illustrated in FIG. 3B, a sensing unit 340 may be provided on at least one area of the main body 301 or the band 302. The sensing unit 340 may further include characteristics specialized for the wearable device as well as those characteristics described in FIG. 1A. For example, the sensing unit 340 may sense a worn state of the main body 301. In more detail, the sensing unit 340 may be arranged on a portion of the main body 301 where it comes in contact with a user's wrist, so as to sense whether or not the main body 301 has been worn by the user in a periodical or non-periodical manner.

Here, the sensing unit 340 may sense the worn state by using an element, such as reflected light, infrared ray, laser beam and the like, which come from a surface of an object. Also, the sensing unit 340 may further include at least one of a temperature sensor and a heart rate sensor, and thus more accurately sense the worn state according to the user's physical features (conditions), such as body temperature, heart rate and the like.

In addition to the body temperature and the heart rate, the sensing unit 340 may sense a biological signal generated in the user's body. The biological signal refers to an electric signal which is generated by body tissues, such as fine cells and the like. Various electric main measures include electroencephalogram, electrocardiogram, electromyogram, ocular electrical conductivity, galvanic skin response and the like. Various physical main measures include blood pressure, arrhythmia, stroke volume, pulse deficit, respiration rate and the like.

Also, the sensing unit 340 may sense a gesture of a user who wears the main body. Thus, the sensing unit 340 may include at least one of an acceleration sensor, a magnetic sensor, a G-sensor, a gyroscope sensor, and a motion sensor. The sensing unit 340 may sense the user's gesture by combination of information sensed by at least one of those sensors.

With reference to FIG. 1A, the wearable device 300 disclosed herein may employ short-range communication technologies, such as BLUETOOTH™, Radio Frequency IDentification (RFID), Infrared Data Association (IrDA), Ultra-WideBand (UWB), ZigBee, Near Field Communication (NFC), Wireless USB (Wireless Universal Serial Bus), and the like. The wearable device 300 may perform communication with a preset mobile terminal 100 using those short-range communication technologies.

Hereinafter, description will be given of a system which includes the mobile terminal 100 and the wearable device 300 with reference to the accompanying drawings. It will be obvious to those skilled in the art that the present disclosure can be specified into other specific forms without departing from the scope and essential features of the present disclosure.

Figure 4:
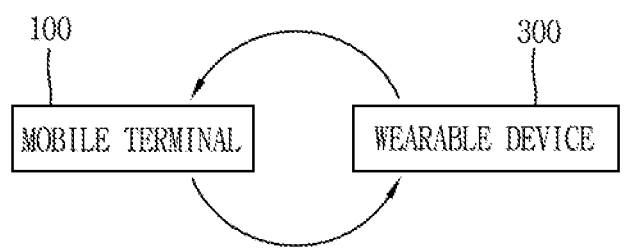
FIG. 4 is a block diagram of a system including a mobile terminal and a wearable device according to an embodiment of the present disclosure.

FIG. 4 is a block diagram of a system including a mobile terminal and a wearable device according to an embodiment of the present disclosure. A system disclosed herein includes a mobile terminal 100 and a wearable device 300.

Unlike the wearable device 300, the mobile terminal 100 is not worn, and thus should be protected from the use by a third party. Thus, the mobile terminal 100 may execute a lock mode, in which a reception of a control command applied by a user is restricted as soon as the display unit 151 is deactivated. Once the lock mode is activated (or in a lock state), the controller 180 displays a lock screen for receiving a password which is input upon activating the display unit 151.

Here, "a deactivated state (or an inactive state) of the display unit 151" refers to a turn-off state of a light provided in the display unit 151 to illuminate the display unit 151. For example, in the deactivated state of the display unit 151, any information or graphic image is not displayed on the display unit 151.

Unlike this, "an activated state (or an active state) of the display unit 151" refers to a turn-on state of the light provided in the display unit 151 to illuminate the display unit 151. In the activated state of the display unit 151, different screen information is displayed on the display unit 151 according to the control of the controller 180. In addition, when the display unit 151 is activated in the lock state, the controller 180 displays a lock screen linked to an input of password information, which is input by the user for releasing the lock state.

Meanwhile, in the lock state, a reception of a user's control command with respect to the mobile terminal may be restricted. For example, the reception of various control commands, such as touch commands, voice commands, gesture commands, and the like, which are associated with performance of operations executable in the mobile terminal, may be restricted in the lock state.

While the mobile terminal 100 is in the lock state, if a preset input is sensed, the display unit 151 may be converted into the activated state and the lock screen associated with the lock state of the mobile terminal may be output on the display unit 151. Here, the preset input for activating the display unit 151 may be an input of pressing a manipulation unit provided at the mobile terminal (for example, a push key 123b located on the side surface), a touch input applied by a preset method (for example, a double touch applied to one area of the display unit 151), or the like.

Screen information for releasing (unlocking) the lock state may be output on the lock screen. For example, the screen information for releasing the lock state may include a plurality of graphic objects to which touch inputs to release (unlock) the lock state are applied. The controller 180 can convert the lock state into an unlock state (or a release state) based on a user request for releasing the current lock state of the mobile terminal. For example, the user request for the release of the lock state may be applied in various manners, such as a touch command, a fingerprint scan, a face recognition, a gesture command, a knock code manner of continuously applying a plurality of touch inputs which match a preset pattern, and the like.

Meanwhile, the wearable device 300 may also execute a lock mode. The lock mode is driven equal to the lock state of the mobile terminal, and the lock mode (or the lock state) may be released in various manners. Here, while the wearable device 300 is worn, once the lock state is released (unlocked), the unlock state is maintained. In more detail, the mobile terminal 100 automatically activates the lock mode whenever the display unit 151 of the mobile terminal 100 is deactivated.

Further, the wearable device 300 does not activate the lock mode even if its display unit 351 is deactivated. Here, when the wearable device 300 is removed, the lock state is automatically activated. This results from the fact that security does not have to be maintained in the worn state of the wearable device 300 but should be kept when the wearable device 300 is removed.

The wearable device 300 may activate the display unit 351, irrespective of the lock state, to display time information. While the time information is displayed, the wearable device 300 may sense a plurality of touch inputs applied to the display unit 351. When a pattern formed by sequentially connecting touch points of the plurality of touch inputs matches a preset pattern, the lock state may be released. Here, the preset pattern corresponds to a pattern set by the user for releasing the lock state.

Meanwhile, there is a requirement for releasing the lock state of the mobile terminal 100 in a simple manner while the wearable device 300 is worn by the user. The user wearing the wearable device 300 corresponds to a main user of the mobile terminal 100, and thus should be able to use the mobile terminal 100 even without an input of a separate password. That is, if the wearable device 300 is in the unlock state, it is appropriate for the user wearing the wearable device 300 to freely use the mobile terminal 100. That is, the user wearing the wearable device 300 should be able to freely use the mobile terminal 100 even without an input of a password to the mobile terminal 100. However, the use by a user without wearing the wearable device 300 should be restricted in the aspect of security.

To satisfy the requirement, the system disclosed herein is configured such that the mobile terminal 100 and the wearable device 300 cooperatively operate. In more detail, when a touch input meeting a preset condition is input by a user who is wearing the wearable device 300 of the unlock state, the mobile terminal 100 releases the lock state, and thus executes different functions based on the state of the wearable device 300 and/or tap characteristics (attributes). Here, the wearable device 300 executes an operation linked to a function executed in the mobile terminal 100.

Hereinafter, description will be given in detail of an operation implemented by the mobile terminal 100 and the wearable device 300 in the system disclosed herein. The mobile terminal 100 includes the sensing unit 140 which senses a tap which is applied to a main body or an object located at a position out of the main body while the display unit 151 is deactivated. When a tap meeting a preset condition is sensed by the sensing unit 140 in the deactivated state, the controller 180 converts the display unit 151 from the deactivated state into the activated state.

Here, the controller 180 can display different screen information according to whether or not the tap meeting the preset condition is input by a user wearing the preset wearable device 300. In more detail, if the tap meeting the present condition is input by 'a user wearing' the preset wearable device 300, the controller 180 releases the lock state, converts the display unit 151 from the deactivated state into the activated state, and outputs first screen information on the activated display unit 151. Further, if the tap meeting the preset condition is input by 'a user without wearing' the preset wearable device 300, the controller 180 maintains the lock state, and outputs second screen information, which is different from the first screen information, on the display unit 151 converted into the activated state. For example, the first screen information may correspond to an execution screen of the most recently executed function or a home screen, and the second screen information may correspond to a lock screen.

In addition, the controller 180 can display different screen information according to the state of the wearable device 300 and/or the tap characteristics when the tap meeting the preset condition is input. To execute such cooperative operation between the mobile terminal 100 and the wearable device 300, the mobile terminal 100 and the wearable device 300 may be configured to exchange data (or to be cooperative) with each other. The short-range communication module 114 may sense (or recognize) the wearable device 300 which is located near the mobile terminal 100 to be communicable with the mobile terminal 100.

Also, when the sensed wearable device 300 is an authenticated device (or a preset device) to communicate with the mobile terminal 100, the controller 180 can transmit at least part of data processed in the mobile terminal 100 to the wearable device 300 through the short-range communication module 114. Therefore, the user may use the data processed in the mobile terminal 100 through the wearable device 300. For example, when a call is received in the mobile terminal 100, the call may be answered through the wearable device 300. Or, when a message is received in the mobile terminal 100, the message can be checked through the wearable device 300. That is, the mobile terminal 100 may be mutually synchronized with the preset wearable device 300 located within a predetermined distance.

Meanwhile, the mobile terminal 100 may sense a tap, which meets a preset condition, input by a user who is wearing the preset wearable device 300. In more detail, the mobile terminal 100 may sense that the tap corresponding to the preset condition is applied to the main body or an object where the main body is placed, and also sense that the tap corresponding to the preset condition is applied by the user who is wearing the preset wearable device 300.

Figure 5:
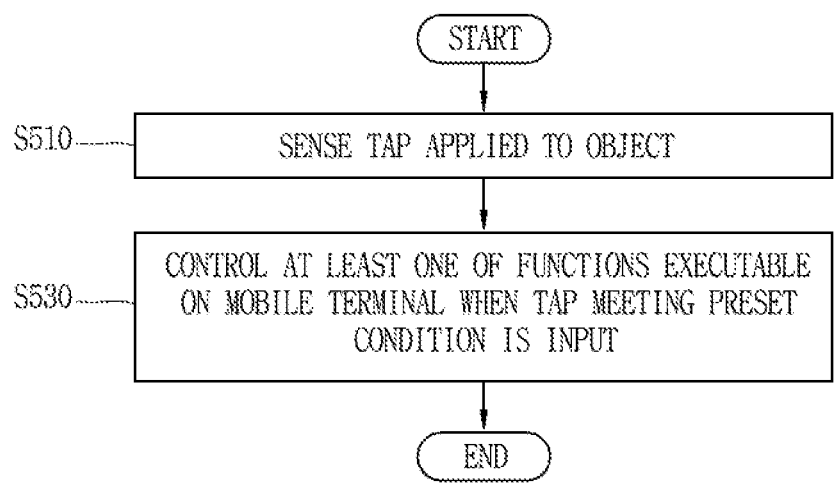
FIG. 5 is a flowchart illustrating a control method of a mobile terminal executing a specific function in response to a tap, which meets a preset condition, according to an embodiment of the present disclosure.

First of all, a method of controlling a function associated with a terminal in response to a touch input meeting a preset condition will be described in detail. FIG. 5 is a flowchart illustrating a control method of a mobile terminal executing a specific function in response to a tap, which meets a preset condition, according to an embodiment of the present disclosure.

As illustrated in FIG. 5, the controller 180 senses a tap applied to an object (S510). The sensing unit 140 senses the tap applied to a main body of the mobile terminal 100, irrespective of an activated or deactivated state of the display unit 151. Here, the tap or tap gesture may refer to a gesture of tapping the main body of the mobile terminal 100 or an object located at a position out of the main body. In more detail, the tap may be understood as an operation of tapping the main body of the mobile terminal 100 or the object using a tap element (tool), such as a finger or the like, or an operation of slightly contacting the tap element with the main body of the mobile terminal 100 or the object.

An element (or the tap element) by which the tap gesture is applied may be any material which can apply an external force to the main body of the mobile terminal 100 or the object. Examples of the tap element may be a finger (a portion with a fingerprint), a stylus pen, a pen, a pointer, a fist (a knuckle joint) and the like. Meanwhile, the tap element may not be limited to an element by which a touch input is applicable to the mobile terminal, and may be any type if it is a material capable of applying an external force to the main body of the mobile terminal 100 or the object.

The object to which the tap is applied may include at least one of the terminal main body and the position out of the terminal main body. That is, an input area of the mobile terminal may extend to the outside of the terminal body. Therefore, an area where the tap can be sensed at the position out of the terminal main body becomes a virtual input area.

The virtual input area may change in width according to a place or object where the terminal is placed or intensity of the tap. For example, when the terminal is placed on a table or the like, if the user taps the table, the terminal may generate a movement and accordingly the tap may be sensed. When the tap intensity increases, the virtual input area may more increase. As another example, when the terminal main body is grasped by the user, the virtual input area may disappear.

In sensing the tap, only when at least two tap gestures are applied within a reference time, it may be determined that 'the tap meeting the preset condition' has been sensed. For example, when one tap is applied to the display unit 150 by a touch element which can apply a touch input onto the display unit 151, the controller 180 can recognize the one tap as a touch input. That is, in this instance, the controller 180 can control a function according to the touch input corresponding to the one tap (for example, a function of selecting an icon output on a point to which the touch input has been applied).

Therefore, the controller 180 can determine that 'the tap meeting the preset condition' for controlling at least one function has been sensed by the sensing unit 140, only when at least two (or plural) taps are continuously applied within a reference time. In addition to the sensing of the plural taps within the reference time, only when the plural taps are applied within a predetermined area, it may be determined that 'the tap meeting the preset condition' has been sensed. For example, the tap may refer to a plurality of taps which are continuously sensed within the predetermined area within the reference time.

For the sake of explanation hereinafter, continuously applying at least two taps to a predetermined area within a reference time is referred to as 'a tap meeting a preset condition' but the present disclosure may not be limited to this. That is, 'the tap meeting the preset condition' may change into various manners for use. For example, 'the tap meeting the preset condition' may be changed into a tap pressing a power button, which is formed for power-on or power-off, or a tap pressing a home button, which is provided to display a home screen. The reference time may be an extremely short period of time, for example, a time in the range of 300 ms to 2 s. Also, the predetermined area may refer to a narrow area in which points with the tap gestures applied are the same or seem to be the same.

Thus, when a first tap applied to the terminal body or the object is sensed by the sensing unit 140, a predetermined area may be calculated from a point where the first tap has been sensed. When another tap following the first tap is sensed on the predetermined area within the reference time after the time when the first tap has been sensed, the sensing unit 140 or the controller 180 can determine that 'the tap meeting the preset condition' has been sensed.

The reference time and the predetermined area may vary in various ways according to embodiments. Meanwhile, in the present disclosure, 'the tap meeting the preset condition' may be sensed by an acceleration sensor and/or a touch sensor included in the sensing unit 140. When the sensing unit 140 corresponds to the acceleration sensor, the sensing unit 140 may measure a movement which is generated due to acceleration of the terminal body, vibration, impact and the like, and sense 'the tap meeting the preset condition' based on the movement.

That is, the acceleration sensor may sense the movement (or vibration) of the terminal body, which is generated by the tap, and accordingly sense whether or not 'the tap meeting the preset condition' has been applied to an object. Therefore, the acceleration sensor may sense a tap with respect to the terminal body, or sense a tap with respect to an object which is located as close to the terminal body as being capable of sensing the generation or non-generation of the movement or vibration of the terminal body.

In such a manner, if it is possible to sense the movement or vibration of the terminal body, the sensing unit 140 may sense the tap even when the tap is applied to a point out of the terminal body as well as the case where the tap is applied to the terminal body. When the sensing unit 140 corresponds to the touch sensor, the sensing unit 140 may sense 'the tap meeting the preset condition' in a different manner according to an activation or deactivation of the display unit 151.

For example, when the display unit 151 is in the activated state, it should immediately be responsive to a user input. Thus, the touch sensor may execute an active mode of maintaining the activated state (including a case that the activated state and the deactivated state are converted by a period as fast as being considered as substantially activated). Further, when the display unit 151 is in the deactivated state, the touch sensor may execute a doze mode in which the activated state and the deactivated state are converted by a preset period, so as to save a battery.

With a shorter activation period, the touch sensor may relatively fast sense 'the tap meeting the preset condition,' applied to the display unit 151, but power consumption due to the touch sensor may increase. Further, with a longer activation period of the touch sensor, the power consumption by the sensing unit 140 may decrease but 'the tap meeting the preset condition' may be sensed more slowly.

Therefore, the preset period may be set to be fast enough that the sensing speed cannot be recognized by the user and set to increase efficiency of the power consumption, in view of sensing the touch applied to the display unit 151. For example, the preset period may be set such that the touch sensor can be activated thirty times (30 Hz) per second. This corresponds to a minimal current level for recognizing a touch in the deactivated state of the display unit 151.

The touch sensor, which executes the doze mode in the deactivated state of the display unit 151, may execute the active mode when a first tap is applied to the display unit 151. That is, when it is determined that the tap is applied while the display unit 151 is in the deactivated state, the touch sensor may execute the active mode so as to more accurately sense a tap which is to be applied later. For example, when the active mode is executed, the touch sensor may be set to be activated by about 120 times (120 Hz) per second.

When a second tap is not sensed within the reference time from the time point that the first tap has been applied, the touch sensor may be converted from the active mode into the doze mode. This is to prevent a malfunction of the terminal caused due to a user-unexpected tap applied. Meanwhile, the sensing unit 140 may sense 'the tap meeting the preset condition' using at least one of a sound sensor sensing a tap using sounds generated around the main body, a proximity sensor sensing a tap based on an existence or non-existence of an object located near the main body, and a pressure sensor sensing a tap using pressure applied to the main body.

Also, the sensing unit 140 may include a touch sensor, a MIC sensor, a proximity sensor, an RGB sensor, a pressure sensor and the like, and classify characteristics (or attributes) of sensed taps (for example, strength, location, time interval between a first tap and a second tap, an element applying the tap, intensity, an area and the like).

For example, the touch sensor may be located at the main body to sense a tap using a touch input applied onto the main body. The touch sensor may also calculate a point to which the tap is applied, and identify an element (for example, a finger, a fingernail, a palm of a hand, etc.) applying the tap using a tapped area. As another example, the MIC sensor may sense a tap using sounds generated around the main body. Since the sound has a specific frequency characteristic, the MIC sensor may distinguish an object (for example, a finger, a fingernail, a palm of a hand, etc.) applying the tap and a pattern of the tap using the frequency characteristic of voice information received.

As another example, even if 'the tap meeting the preset condition' is sensed by the acceleration sensor and/or the touch sensor, when the controller 180 detects an object located adjacent to a front surface of the main body by means of the proximity sensor, the controller 180 can reject 'the tap meeting the preset condition.' That is, when the object located adjacent to the front surface of the main body is sensed by the proximity sensor, the controller 180 can restrict an execution of a function corresponding to 'the tap meeting the preset condition.' This is because the mobile terminal 100 placed in a bag or pants is likely to malfunction in the bag or pants.

As another example, the RGB sensor may sense a color of an element applying a tap, and identify a type of the element using the sensed color. For example, a finger and a touch pen may be distinguished by means of the RGB sensor in the present disclosure. As another example, the pressure sensor may sense a tap using pressure applied to the main body, and calculate intensity of pressure generated in response to the tap.

As another example, a piezo sensor (or a shock sensor) which uses a property that electricity is generated on a surface of a crystal when pressure is applied in a specific direction may sense a tap. The acceleration sensor senses a movement corresponding to several hundreds of hertz (Hz), whereas the piezo sensor may sense a movement corresponding to several thousands of hertz (Hz). Therefore, the piezo sensor can sense the movement (or shock) of the terminal more accurately.

In addition, the controller 180 can identify the characteristic of the tap using the piezo sensor. In more detail, since a different physical pattern is generated according to the characteristic of a tap, which causes an impact on an object, the piezo sensor may realize the characteristic of the tap using an experimentally-obtained physical pattern. The experimentally-obtained physical pattern is composed at a factory-releasing stage and stored in the memory 160. Such pattern may be periodically updated or changed by a user.

Meanwhile, to sense a tap applied to the main body, the mobile terminal may use one of the acceleration sensor and the touch sensor, sequentially use the acceleration sensor and the touch sensor or simultaneously use both of the acceleration sensor and the touch sensor. To sense the tap, a mode using only the acceleration sensor may be referred to as a first mode, a mode using only the touch sensor may be referred to as a second mode, and a mode using both of the acceleration sensor and the touch sensor (simultaneously or sequentially) may be referred to as a third mode or a hybrid mode. In addition, the controller 180 can determine whether 'the tap meeting the preset condition' has been sensed, by overall considering sensing signals generated from those sensors. Accordingly, the characteristics of the tap, such as a tap-sensed position and the like, can be recognized more accurately.

In other words, the touch screen includes a touch sensor and a display, and is driven in the following drive states: a drive state A in which the touch sensor is in a doze mode and the display is off, a drive state B in which the touch sensor is in an active mode and the display is off, and a drive state C in which the touch sensor is in the active mode and the display is on, wherein the doze mode corresponds to the touch screen being driven with the lower rate sensing signal, and wherein the tap meeting the preset condition is input in the drive state A, the second touch input is input in the drive state B, and the released locked state is in the drive state C.

Next, when the tap applied to the terminal body or the object located at the position out of the terminal body is sensed, at least one of functions executable on the terminal is controlled (S530). That is, when a tap corresponding to a present condition is applied to the terminal body or an object located at a position out of the terminal body, the controller 180 can control at least one of functions executable on the terminal.

Here, the function executable on the terminal may refer to any type of function which is executable or driven on the mobile terminal. For example, one of the executable functions may be an application installed in the mobile terminal. For example, the term 'a function is executed' may mean that 'an application is executed or run.'

As another example, the executable function on the mobile terminal may be a function of receiving an event. Here, the received event may be a message reception event, a call reception event and the like. The event may also be an event generated in the application installed in the mobile terminal. As another example, the executable function on the mobile terminal may be a function required for basic driving of the mobile terminal. For example, the function required for the basic driving may be a function of turning on or off the light provided in the display unit 151, a function of converting the mobile terminal from the unlock state into the lock state or from the lock state into the unlock state, a function of setting a communication network, a function of changing setting information of the mobile terminal and the like.

Thus, according to the present disclosure, when a tap applied to the main body of the mobile terminal or a position out of the terminal body meets a preset condition, the controller 180 can control at least one of functions executable on the mobile terminal. Here, the preset condition for the tap may be associated with at least one of the number of times that the tap is applied, a position, speed, intensity, a pattern and an area. For example, the controller 180 can control the at least one of the executable functions only when the tap is applied twice.

Also, the preset condition may correspond to sensing a first tap, which is applied to the main body or the object by a first reference number of times or more than the first reference number of times, and thereafter sensing a second tap, which is applied to the main body or the object by a second reference number of times or more than the second reference number of times.

That is, the controller 180 can prepare the terminal in a ready state (or the activated state) in response to the first tap being sensed, and thereafter controls the mobile terminal when the second tap is applied. That is, the user may first apply the first tap to transfer information, which indicates that the mobile terminal will be controlled using the tap, to the mobile terminal.

The controller 180 can carry out the at least one control corresponding to the second tap only when the second tap is sensed within a preset time after the first tap was sensed. That is, the controller 180 can recognize the second tap as a valid tap only when the second tap is sensed within the preset time after the first tap was sensed, thereby identifying whether the user desires to control the mobile terminal or has applied the tap by mistake.

Here, the first reference number of times and the second reference number of times may be the same as or different from each other. For example, the first reference number of times may be three times and the second reference number of times may be two times. As another example, both of the first reference number of times and the second reference number of times may be more than two times.

The controller 180 can also change setting information related to a currently-driven function or a function corresponding to screen information output on the display unit among currently-driven functions, in response to the second tap. In this instance, when the second tap is applied, the controller 180 can output on the display unit 151 guide information related to setting information controllable according to a position to which the second tap is applied. In addition, when 'the tap meeting the preset condition' has been input, the controller 180 can execute a different function according to whether or not the tap has been input by a user wearing the preset wearable device 300.

Figure 6:
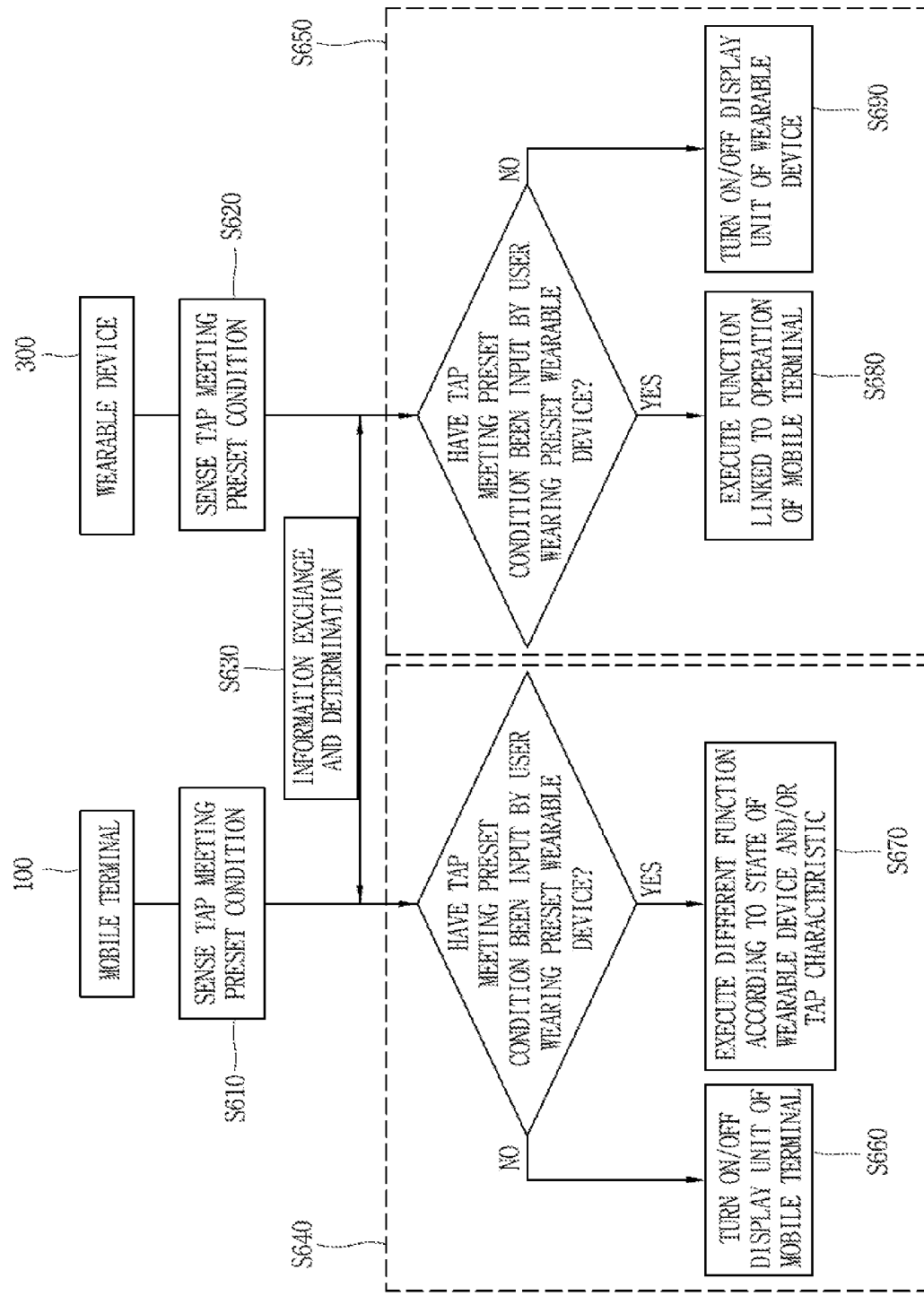
FIG. 6 is a flowchart illustrating a control method of a mobile terminal executing a different function according to whether or not a tap meeting a preset condition has been input by a user wearing a preset wearable device.
Figure 7:
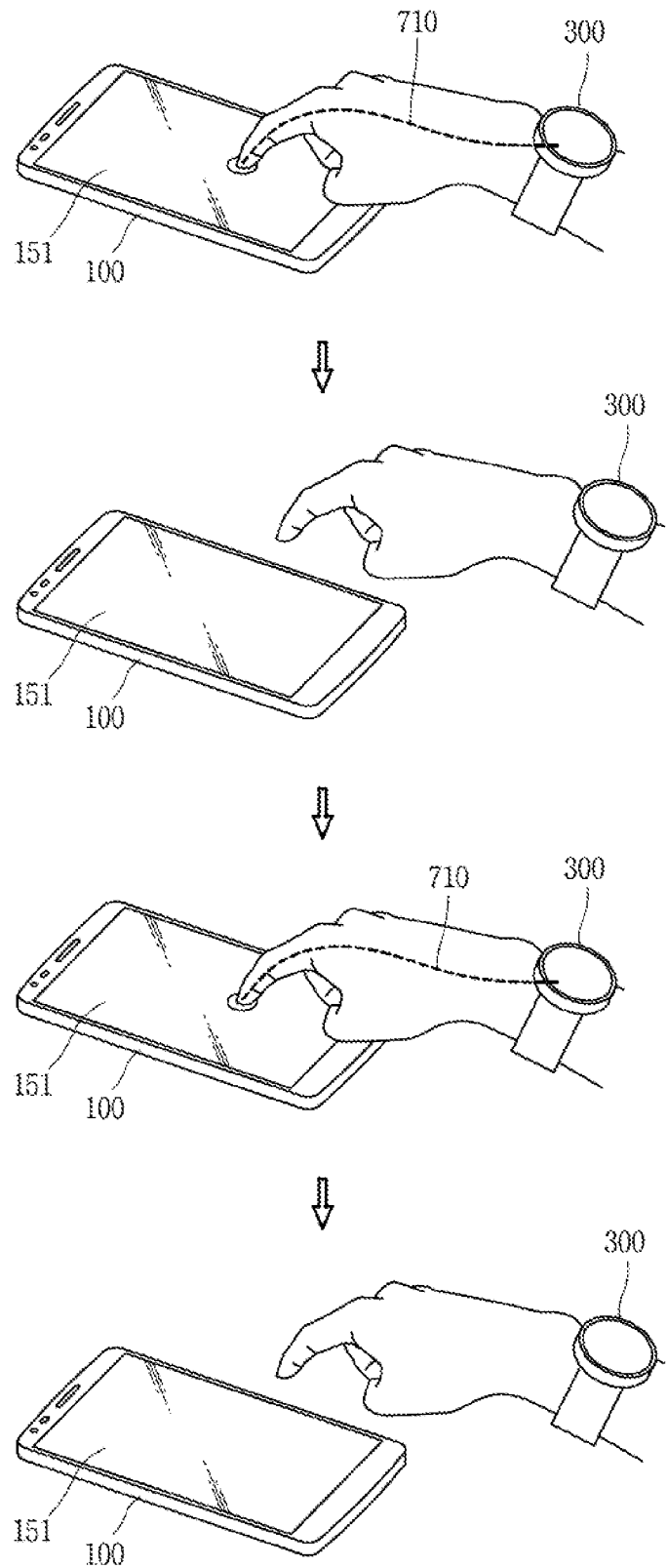
FIG. 7 is a conceptual view illustrating one example of a method in which a mobile terminal and a wearable device sense 'a tap meeting a preset condition' according to an embodiment of the present disclosure.

FIG. 6 is a flowchart illustrating a control method of a mobile terminal executing a different function according to whether or not a tap meeting a preset condition has been input by a user wearing a preset wearable device, and FIG. 7 is a conceptual view illustrating one example of a method in which a mobile terminal and a wearable device sense 'a tap meeting a preset condition' according to an embodiment of the present disclosure.

As illustrated in FIG. 6, a system disclosed herein may include a mobile terminal 100 and a wearable device 300. Here, the mobile terminal 100 and the wearable device 300 correspond to devices which have been authenticated (or set) to automatically communicate with each other. That is, the mobile terminal 100 and the wearable device 300 refer to devices previously registered by the user.

The mobile terminal 100 and the wearable device 300 can mutually store identification information for security. When they are located within a predetermined distance, they can check the identification information and synchronize with each other. Here, an identification module may be a physical medium, such as a universal integrated circuit card (UICC) (for example, a subscriber identification module (SIM) or a universal SIM (USIM)), a secure micro SD, a speaker and the like, or an embedded secure element (SE) in the wearable device 300.

Here, as the mobile terminal 100 and the wearable device 300 are preset by the user, they are subject to being 'linked' to each other when they are located within a preset range. In more detail, that the mobile terminal 100 and the wearable device 200 are 'linked' to each other refers to a connected state in which the mobile terminal 100 and the wearable device 300 are connected to each other so as to organically operate in correspondence with 'a tap meeting a preset condition,' namely, a connected state in which the mobile terminal 100 and the wearable device 300 can simultaneously perform a mutually linked operation in response to 'the tap meeting the preset condition.'

To distinguish this connected state from a connection between devices for exchanging data, such connected state is referred to as 'the mobile terminal 100 and the wearable device 300 being "linked" to each other.' In other words, the typical connection between the mobile terminal 100 and the wearable device 300 for exchanging data is referred to as 'pairing' and this pairing may be distinctive from the linking. This is because that the mobile terminal 100 and the wearable device 300 in the paired state merely execute data transmission and reception, with failing to perform the mutually linked operation in response to 'the tap meeting the preset condition.'

Meanwhile, to allow the user to recognize whether the connection between the mobile terminal 100 and the wearable device 300 is the pairing for the typical data transmission and reception or the linking enabling the execution of the mutually linked operation in response to 'the tap meeting the preset condition,' feedbacks which correspond to the pairing and the linking may be output in different manners.

When the user inputs 'the tap meeting the preset condition' while wearing the preset wearable device 300, the mobile terminal 100 and the wearable device 300 sense 'the tap meeting the preset condition,' simultaneously (S610, S620). The method of sensing 'the tap meeting the preset condition' has been described with reference to FIG. 5, so description thereof will not be repeated.

When 'the tap meeting the preset condition' is input in the linked state, the mobile terminal 100 and the wearable device 300 determine whether or not 'the tap meeting the preset condition' has been input by the user wearing the wearable device 300 through information exchange therebetween. Here, a subject that determines whether 'the tap meeting the preset condition' has been input by the user wearing the preset wearable device 300 may vary according to embodiments.

For example, the determination subject may be the mobile terminal 100 or the wearable device 300. In more detail, when 'the tap meeting the preset condition' is input, the mobile terminal 100 and the wearable device 300 share information related to the sensed tap, namely, mutually transmit and receive such information. One of the mobile terminal 100 and the wearable device 300 determines whether 'the tap meeting the preset condition' has been input by the user wearing the preset wearable device 300, by overall considering information sensed thereby and information received from the other. According to the determination result, the one device may transmit a notification signal notifying that a preset gesture has been sensed to the other, and the other device may execute the mutually linked operation in response to the notification signal. Further, when the notification signal is not transmitted thereto or a signal notifying that the preset gesture has not been sensed is received, the other device restricts the execution of the mutually linked operation.

As another example, the mobile terminal 100 and the wearable device 300 may be physically distinguished from each other but allowed to simultaneously execute a process with respect to 'the tap meeting the preset condition' together. Like a dual core, when 'the tap meeting the preset condition' is input, the mobile terminal 100 and the wearable device 300 may cooperatively determine whether 'the tap meeting the preset condition' has been input in the worn state as well as whether the user is wearing the wearable device 300.

That is, the mobile terminal 100 and the wearable device 300 may sense 'the tap meeting the preset condition' using the sensing units provided to them, respectively, and at least one of the mobile terminal 100 and the wearable device 300 may determine whether or not 'the tap meeting the preset condition' has been input by the user wearing the preset wearable device 300.

The at least one of the mobile terminal 100 and the wearable device 300 determines whether 'the tap meeting the preset condition' has been input by the user wearing the preset wearable device 300 by comparing information related to the tap sensed in the mobile terminal 100 with information related to the tap sensed in the wearable device 300. For the sake of explanation, 'the tap meeting the preset condition by the user wearing the preset wearable device' is referred to as 'a tap input by a main user.'

For example, the determination as to 'the tap input by the main user' may be executed based on the correspondence between the movement of the mobile terminal 100 and the movement of the wearable device 300 in response to 'the tap meeting the preset condition.' That is, when a movement of a main body in response to the same tap is sensed simultaneously in the mobile terminal 100 and the wearable device 300, it is determined that 'the tap input by the main user' has been applied. Further, when the movement in response to the same tap is not sensed, it is determined that 'the tap meeting the preset condition' has been input by a user who does not wear the preset wearable device 300. That is, it is determined that 'the tap input by the main user' has not been input.

Meanwhile, at least one of the mobile terminal 100 and the wearable device 300 may sense 'the tap input by the main user' using electric conductivity which is generated between the mobile terminal 100 and the wearable device 300 by the user. In more detail, it may be determined whether 'the tap meeting the preset condition' has been input by the user wearing the wearable device 300 using movement of electric charges which are generated between the mobile terminal 100 and the wearable device 300 when a tap is applied to the main body.

Referring to FIG. 7, when the user wearing the wearable device 300 comes in contact with the main body of the mobile terminal 100, electric conductivity 710 is generated between the mobile terminal 100 and the wearable device 300 through the user's body. Further, when the contact is released, the generation of the electric conductivity between the mobile terminal 100 and the wearable device 300 may be stopped. At least one of the mobile terminal 100 and the wearable device 300 may determine based upon such characteristic whether 'the tap input by the main user' has been applied.

Meanwhile, when the mobile terminal 100 and the wearable device 300 are not in the linked state, 'the tap meeting the preset condition' sensed in the mobile terminal 100 is determined as being input by a user who does not wear the preset wearable device 300. That is, when 'the tap meeting the preset condition' is sensed while the wearable device 300 is not located within a predetermined distance, 'the tap meeting the preset condition' corresponds to an input by a user without wearing the preset wearable device 300.

The mobile terminal 100 executes a different function according to whether 'the tap meeting the preset condition' has been input by the user wearing the preset wearable device 300 (S640). In more detail, when 'the tap meeting the preset condition' is input by the user wearing the preset wearable device 300 while the display unit 151 remains deactivated in the lock state, the lock state is released and the display unit 151 is converted from the deactivated state into an activated state, such that first screen information can be output on the display unit 151 converted into the active state (S670).

Further, when 'the tap meeting the preset condition' is input by a user without wearing the preset wearable device 300, the lock state is maintained and the display unit 151 is converted from the deactivated state into the activated state, such that second screen information different from the first screen information can be output on the display unit 151 converted into the active state (S660). For example, the first screen information may correspond to an execution screen of the most recently executed function or a home screen, and the second screen information may correspond to the lock screen.

Meanwhile, a type of the first screen information may differ according to a state of the wearable device and/or the characteristic of the tap when 'the tap input by the main user' has been applied (S670). That is, when 'the tap meeting the preset condition' is input by the user wearing the wearable device 300, the mobile terminal 100 may display different screen information according to the state of the wearable device 300 and/or the characteristic of the tap.

The state of the wearable device will first be described in more detail. Different types of control operations may be performed according to the state of the wearable device 300, that is, a currently-run function in the wearable device 300, a type of currently-displayed screen information on the display unit 351 of the wearable device 300, an application corresponding to currently-output screen information on the display unit 351, a turn-on/turn-off state of a light of the display unit 351 and the like.

In more detail, even if 'the tap input by the main user' is sensed, while the display unit 351 of the wearable device 300 is in the deactivated state, the controller 180 displays the home screen or screen information related to the most recently executed function on the display unit 151 of the mobile terminal 100. Further, while the display unit 351 of the wearable device 300 is in the activated state, the controller 180 can display information, which is currently output on the wearable device 300, equally on the display unit 151 of the mobile terminal, or an execution screen of an application, which is associated with information output on the wearable device 300, on the display unit 151 of the mobile terminal 100.

Next, the characteristics of the tap will be described. The controller 180 can control a different function based on a position to which 'the tap input by the main user' has been applied, a component (a microphone, a speaker, or the like) arranged at the tap-applied position, strength of the tap, speed of the tap, an area of the tap, a pattern of the tap, and the like. That is, different types of screen information may be displayed on the display unit 151 of the mobile terminal 100 according to the characteristics of the tap.

Meanwhile, the wearable device 300 may execute a different operation according to whether or not 'the tap meeting the preset condition' is applied while it is worn by the user (S650). First, when 'the tap meeting the preset condition' has been applied but is not 'the tap input by the main user,' the wearable device 300 may turn on/off its display unit 351 (S690). That is, when 'the tap meeting the preset condition' is input onto the wearable device 300 while the user does not wear the wearable device 300, the display unit 351 of the wearable device 300 is converted from one of the activated state and the deactivated state into the other.

Further, when 'the tap input by the main user' is input, the wearable device 300 executes an operation linked to a function, which is executed on the mobile terminal 100, in response to the tap input (S680). Hereinafter, the linked operation will be explained with reference to the accompanying drawings.

Figure 8:
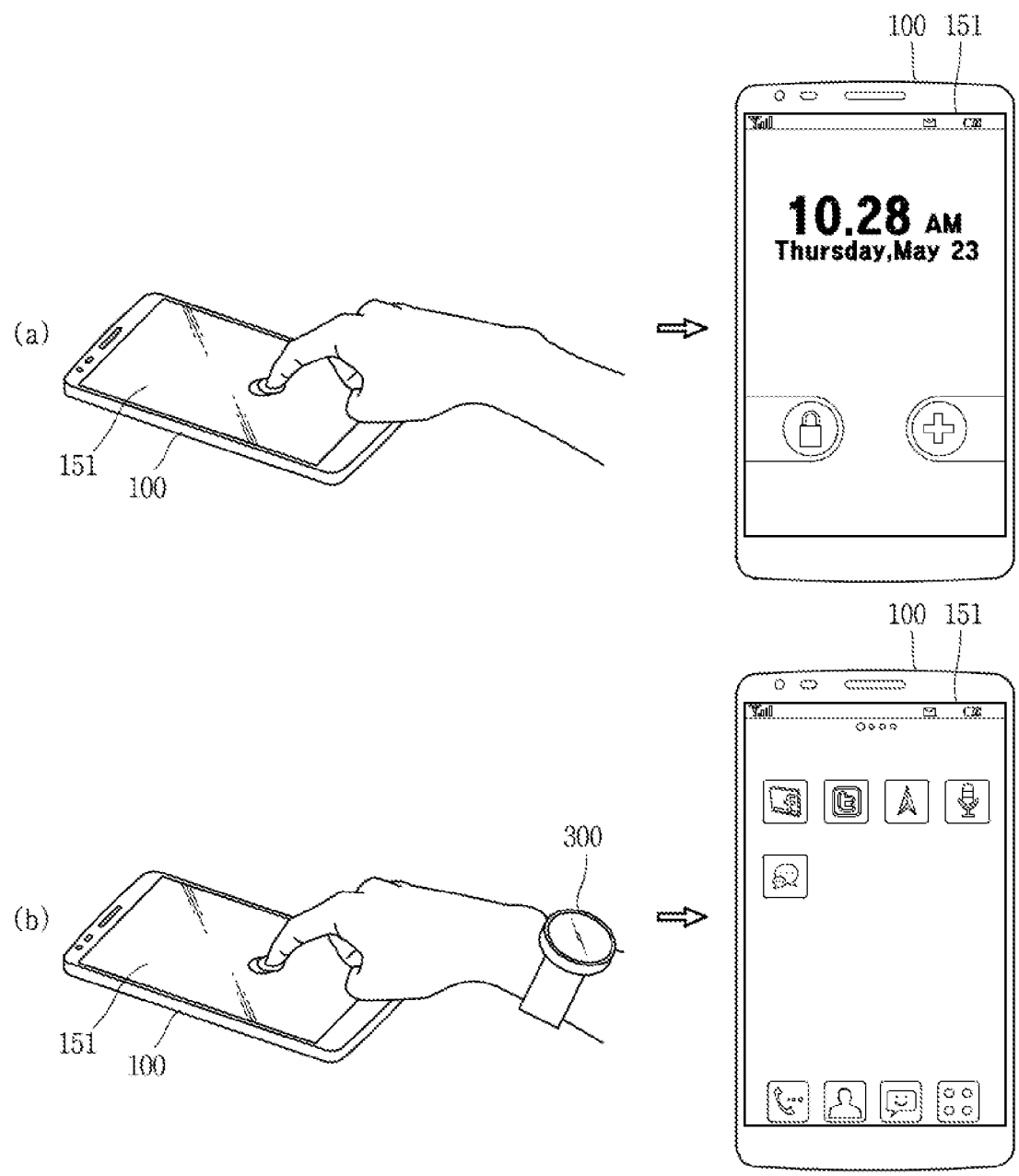
FIG. 8 is a conceptual view illustrating an operation implemented by a mobile terminal and a wearable device in a system according to an embodiment of the present disclosure, which illustrates an execution of a different type of control according to wearing or non-wearing of a preset wearable device.

First, description will be given of characteristics that the mobile terminal 100 executes different functions according to whether or not 'the tap input by the main user' has been input. FIG. 8 is a conceptual view illustrating an operation implemented by the mobile terminal and the wearable device in the system according to an embodiment of the present disclosure, which illustrates an execution of a different type of control according to wearing or non-wearing of the preset wearable device.

The mobile terminal disclosed herein may sense a tap input applied to the main body thereof or an object located at a position out of the main body even while the display unit 151 is in the deactivated state. In such a manner, when the main body of the mobile terminal or the object is tapped while the display unit 151 is in the deactivated state, the controller 180 can convert the deactivated state of the display unit 151 into the activated state. That is, the controller 180 can turn on the light of the display unit 151 in response to the tap being sensed. Here, if the mobile terminal is in the lock state, the lock screen may generally be displayed on the display unit 151. In the mobile terminal disclosed herein, a different function may be executed according to whether or not 'the tap meeting the preset condition' is input by the user wearing the preset wearable device.

For example, as illustrated in (a) of FIG. 8, when 'the tap meeting the preset condition' is input by a user without wearing the preset wearable device 300, the controller 180 converts the deactivated state of the display unit 151 into the activated state with maintaining the lock state. The lock screen is displayed on the display unit 151 converted into the activated state.

Further, as illustrated in (b) of FIG. 8, when 'the tap meeting the preset condition' is input by the user wearing the preset wearable device 300, the controller 180 releases the lock state and converts the deactivated state of the display unit 151 into the activated state. A home screen is then displayed on the activated display unit 151. The home screen may include at least one object. The object may be an icon of an application installed in the mobile terminal or a widget.

Once the wearable device is worn, it can be used only by a user who wears it. This allows for maintenance of security even without an input of a separate password. By using such characteristic, when the user wearing the preset wearable device applies 'the tap meeting the preset condition,' the lock state of the mobile terminal may be released even without an input of a separate password. This results in an increase in user convenience.

Here, when the wearable device worn is removed, the wearable device is automatically converted from an unlock state into a lock state. While the user wears the wearable device in the lock state, the lock state of the mobile terminal 100 is not released even though 'the tap meeting the preset condition' is input. This results from possibility of being used by a third party. Once the lock state of the wearable device is released while the user wears it, at least one of the mobile terminal and the wearable device can be controlled by use of a tap input of tapping an object.

Meanwhile, when 'the tap input by the main user' is applied, different screen information may be displayed on the display unit 151 of the mobile terminal 100 according to the state of the wearable device 300. In more detail, when 'the tap input by the main user' is applied while the display unit 151 remains deactivated in the lock state, the mobile terminal 100 is commonly released from the lock state and the display unit 151 is converted from the deactivated state into the activated state.

Here, the screen information displayed on the activated display unit 151 may differ according to the state of the wearable device when the tap input has been applied. That is, output information can be varied in response to the activation of the display unit 151. The controller 180 can output different information according to the state of the device when the tap input has been applied.

In more detail, the wearable device 300 senses a generation of an event in at least one application. The application is a concept including a widget or a home launcher, and refers to any type of program operable in the terminal. Therefore, the application may be a program for performing functions, such as a web browser, a video reproduction, a message transmission and reception, a schedule management, an application update, or the like.

The event generation, may be a missed call, a presence of an application to be updated, a message reception, charging, power-on or power-off of the terminal, pressing of an LCD awake key, an alarm, an incoming call, a missed notification, and the like. As another example, when specific information is received through the wireless communication unit of the terminal, it means a generation of an event in an application associated with the specific information, and the controller senses such event generation. Or, if there is an item input by a user on the schedule management application, when a date corresponding to the item comes, it means the event generation in the schedule management application.

When an event is generated in at least one application, the wearable device 300 outputs information related to the event using at least one of visible, audible, and tactile methods. For example, the wearable device 300 may output a notification icon notifying the event generation on the display unit 351. However, the notification icon is merely illustrative, and a graphic user interface (GUI) of a currently-executed application may also be output on the display unit 351.

The notification icon may be a circular image along an appearance of the display unit 351, or a different image according to a type of application in which an event has been generated. As another example, a different image may be output according to the type of event or a quantity of information related to the event. Here, the different image refers to an image with a different shape, length, color or the like.

The display unit 351 of the wearable device 300 may be provided with a touch sensor to sense a touch input applied to notification icon. The display unit 351 may output visual information, which is implemented into an image, such as the GUI, text, an icon and the like, but be converted into the deactivated state after a predetermined period of time or in response to an input of a specific control command.

Meanwhile, 'the tap input by the main user' may be applied while the notification icon is output on the display unit 351 of the wearable device 300. Here, in response to 'the tap input by the main user,' the mobile terminal 100 outputs the event-related information or an execution screen of a function associated with the event on the display unit 151. For example, as illustrated in FIG. 9A, the event may be a message reception and the information may be an execution screen of an application associated with the message.

Figure 9A:
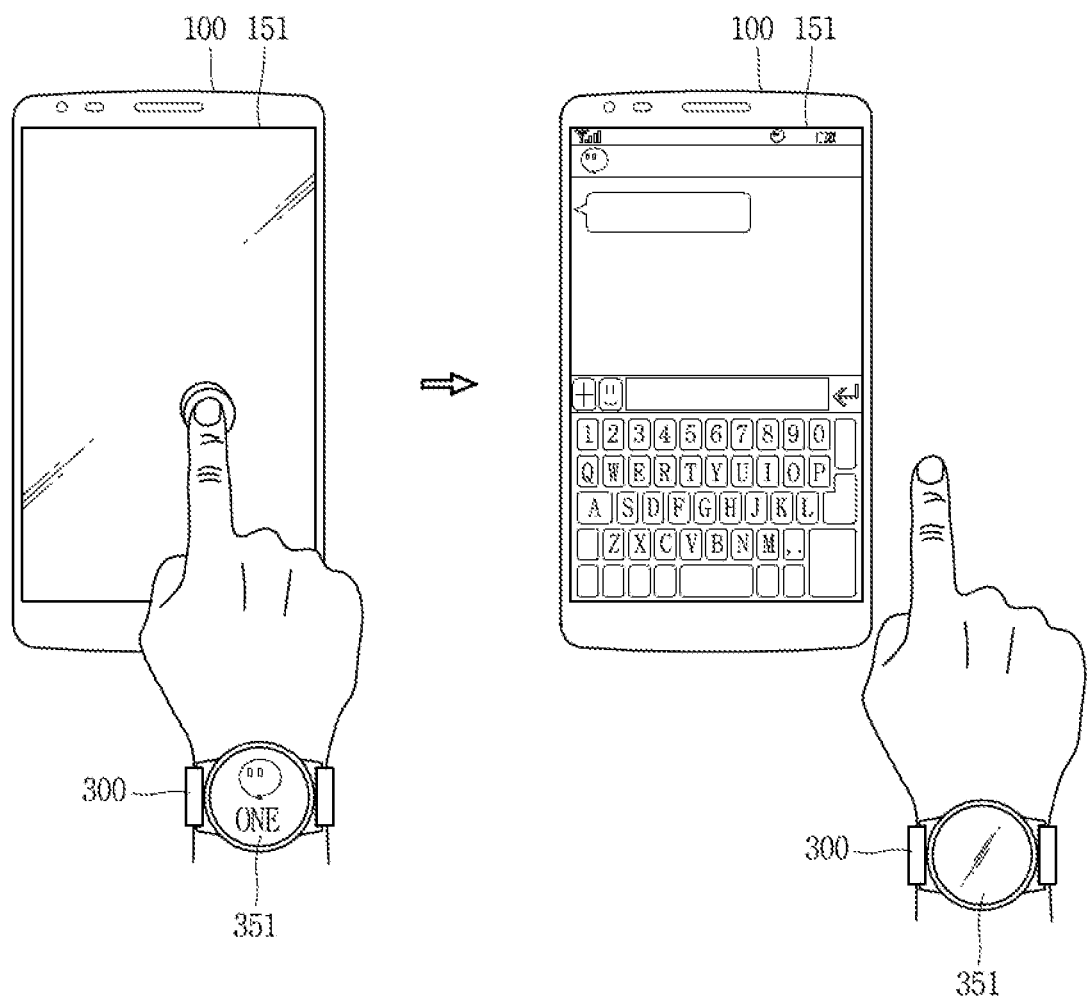

In this instance, the wearable device 300 performs an operation linked to a function executed in the mobile terminal 100 in response to 'the tap input by the main user.' For example, as illustrated in FIG. 9A, when information to be output on the wearable device 300 is entirely output to the mobile terminal 100 in response to 'the tap input by the main user,' the display unit 351 of the wearable device 300 is converted from the activated state into the deactivated state to prevent the loss of power. That is, the wearable device 300 stops the output of the information which is currently output.

Meanwhile, when a touch input applied to the notification icon is sensed, the wearable device 300 may output the event-related information on the display unit 351 in response to the touch input. For example, the event may be a message reception and the information may be contents of the message. As another example, the event may be a notification of a schedule set in the schedule management application and the information may be details of the set schedule and the like. As another example, the event may be a presence of an application to be updated, and the information may be details of the updating.

While the notification icon is displayed on the display unit 351 of the wearable device 300, a touch input with respect to the notification icon may be input. Here, as illustrated in FIG. 9B, the wearable device 300 outputs the event-related information other than the notification icon. Afterwards, when 'the tap input by the main user' is input while the event-related information is displayed on the display unit 351 of the wearable device 300, the mobile terminal 100 can display an execution screen, which is configured to control information displayed on the display unit 351 of the wearable device 300, on its display unit 151.

For example, as illustrated in FIG. 9B, while information related to a received message is displayed on the display unit 351 of the wearable device 300, 'the tap input by the main user' may be applied. Here, the mobile terminal 100 may release the lock state, convert the deactivated display unit 151 into the activated state, and display a virtual keypad for sending a response to the received message on the display unit 151. Here, the information related to the received message is continuously displayed on the display unit 351 of the wearable device 300. This allows the user to write the response using the mobile terminal 100 while checking the received message through the wearable device 300. That is, the mobile terminal 100 may function as an input method editor (IME).

Afterwards, when an additional message is received from the other party, the additionally received message may be displayed on the display unit 351 of the wearable device 300 in the received order. For example, as illustrated in FIG. 9B, after a message "What's up?" is displayed, if another message "Gangnam!" is additionally received, the additionally received message "Gangnam" is displayed at its received time point. Here, a virtual keypad and user-input information are displayed on the display unit 151 of the mobile terminal 100. Accordingly, the wearable device 300 may function as an output element for outputting the received message, and the mobile terminal 100 may function as an input element for inputting a transmitted message or a message to be transmitted.

Meanwhile, when a predetermined time elapses after the event generation, as illustrated in FIG. 9C, the wearable device 300 stops the output of the notification icon, which was output in response to the event generation, and converts the activated display unit 351 into the deactivated state. This prevents the loss of power.

Afterwards, when 'the tap input by the main user' is applied while there is not any information output on the wearable device 300, the mobile terminal 100 displays the home screen or an execution screen of a function which has been the most recently executed in the mobile terminal 100. Here, the mobile terminal 100 may display information related to the event generated in the wearable device 300 on one area of the activated display unit 151. For example, as illustrated in FIG. 9C, the mobile terminal 100 may display a notification icon 910 in response to the event generation on a state information area, or display information related to the event generation, such as "Kakaotalk received!" on a home screen. Here, the state information area refers to an area for outputting at least one of antenna information, communication mode information, battery information, generated event-related information, information related to a set function and time information.

Meanwhile, when a home screen or an execution screen of the most recently executed function is displayed on the mobile terminal 100 in response to 'the tap input by the main user,' the wearable device 300 maintains the display unit 351 in the deactivated state. This results from non-existence of information which is to be additionally displayed on the wearable device 300.

Figure 9D:
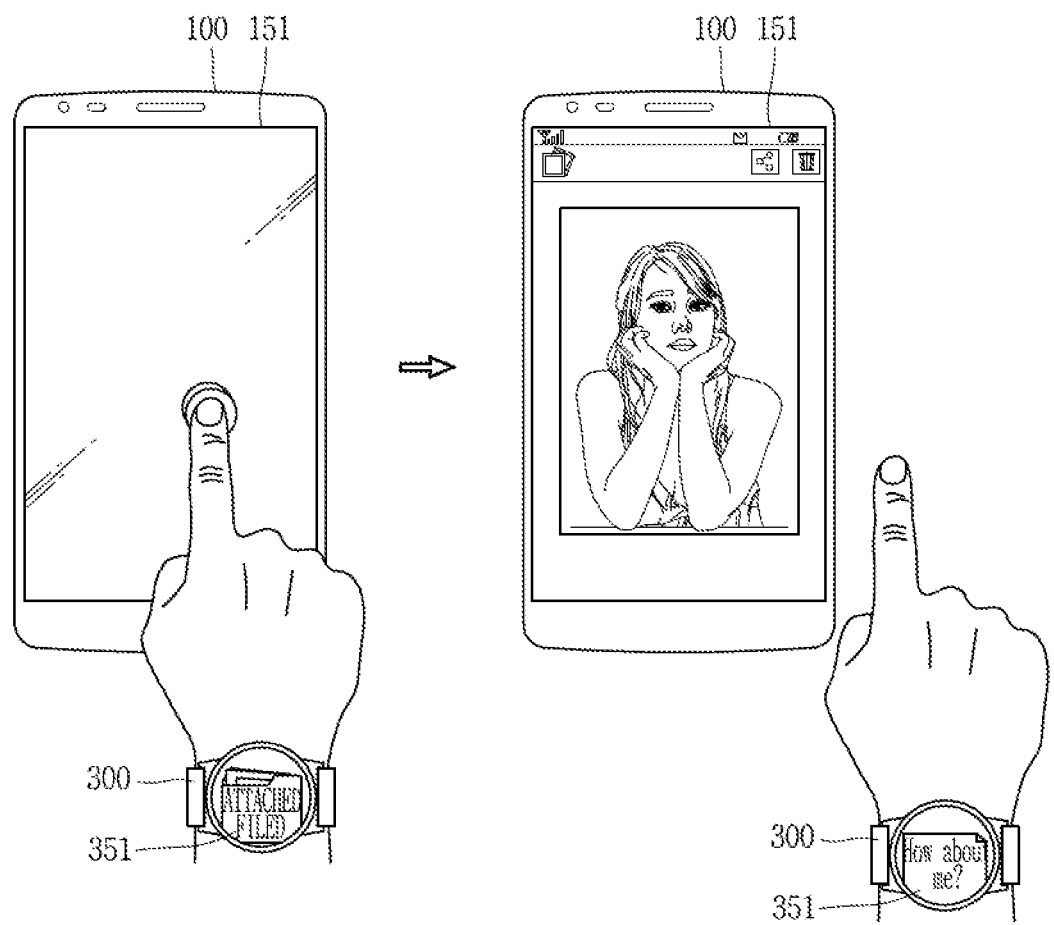

Also, in the wearable device 300 disclosed herein, as illustrated in FIG. 9D, when a received message or mail includes an attached file, a notification icon guiding the presence of the attached file may be output on the display unit 351 of the wearable device 300. Under this state, when 'the tap input by the main user' is input, the mobile terminal 100 may display information related to the attached file on the display unit 151 and the wearable device 300 may display contents of the received message along with the attached file on the display unit 351. This allows the user to simultaneously check the attached file and the received message through the different devices.

As another example, after a main function is activated in the wearable device 300, 'the tap input by the main user' may be applied while information related to the main function executed is output. Here, the wearable device 300 may execute a first sub function included in the main function and the mobile terminal 100 may execute a second sub function included in the main function, such that they can output different information from each other.

Figure 9E:
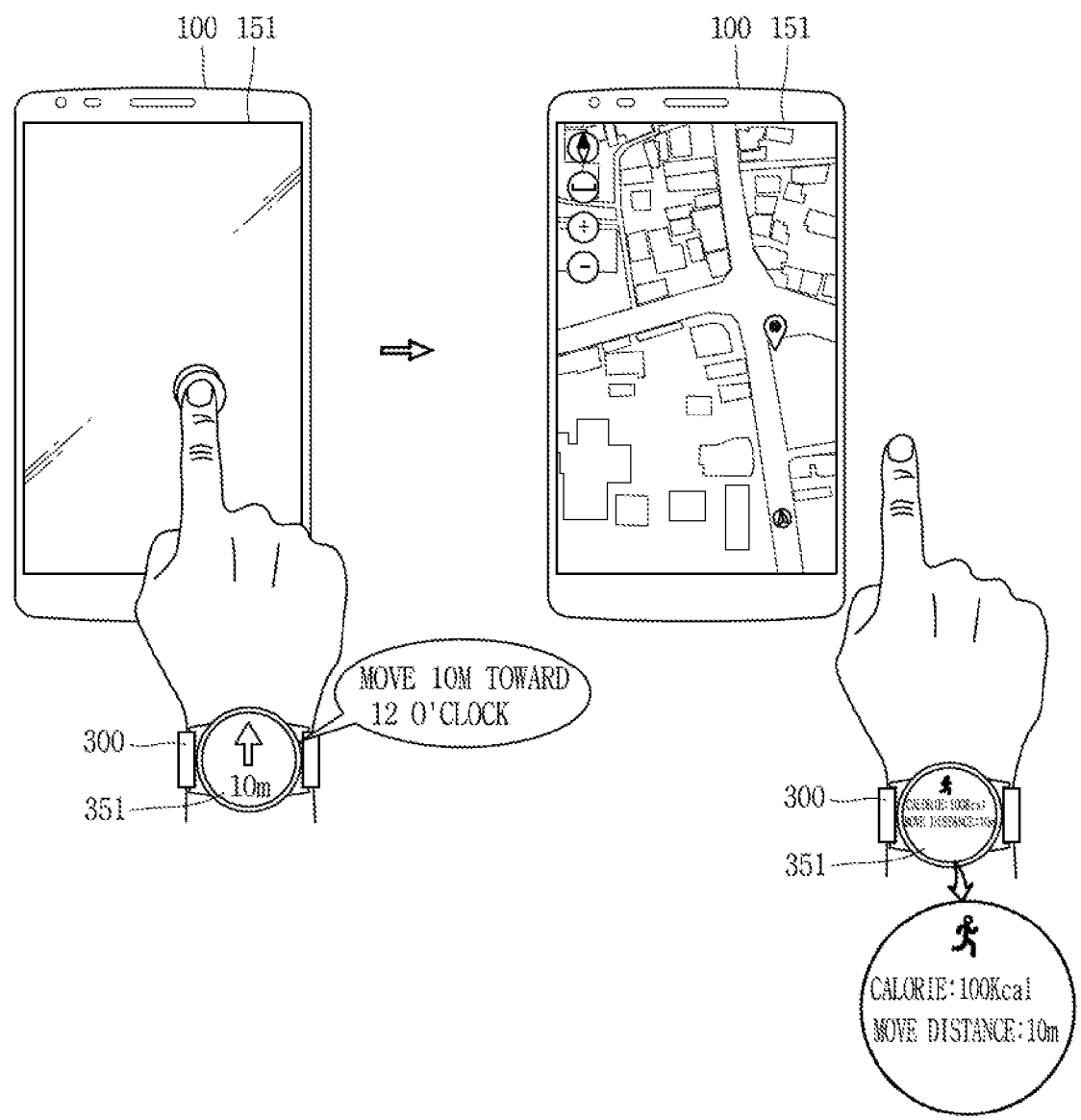

For example, as illustrated in FIG. 9E, a navigation function for guiding a driving path up to a destination may be executed on the wearable device 300. With respect to the navigation function, the first sub function may be a map displaying function of displaying a current position and a path on a map, and the second sub function may be a history displaying function of displaying a history from a start point to the current position. When 'the tap input by the main user' is input while the navigation function is activated on the wearable device 300, the mobile terminal 100 releases the lock state and converts the display unit 151 from the deactivate state into the activated state, so as to output an execution screen of the map displaying function. Further, the wearable device 300 outputs an execution screen of the history displaying function.

Meanwhile, according to the system disclosed herein, the mobile terminal 100 and the wearable device 300 may output different types of screen information from each other according to the state of the mobile terminal 100 as well as the state of the wearable device 300. In more detail, different types of screen information may be output on the mobile terminal 100 and the wearable device 300, respectively, according to whether the main body of the mobile terminal 100 is laid down in a horizontal direction or erected in a vertical direction.

Figure 9F:
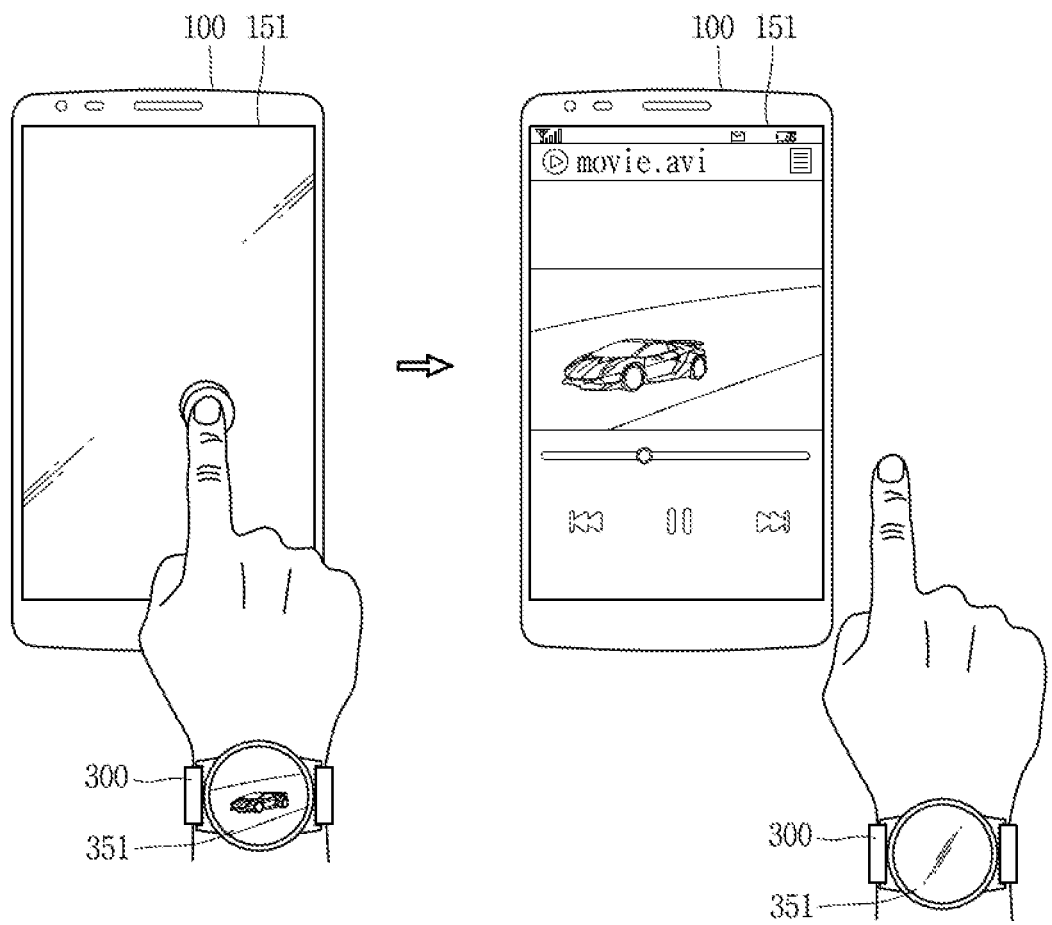

As one example, while a content such as a video is displayed on the wearable device 300, 'the tap input by the main user' may be input. For example, as illustrated in FIG. 9F, when the main body of the mobile terminal 100 is erected in the vertical direction, the wearable device 300 stops the output of the content and converts the display unit 351 into the deactivated state. The mobile terminal 100 executes an application associated with the output of the content, and displays an execution screen of the application. Accordingly, graphic objects for executing a function linked to the control of the content may be displayed on the content.

Figure 9G:
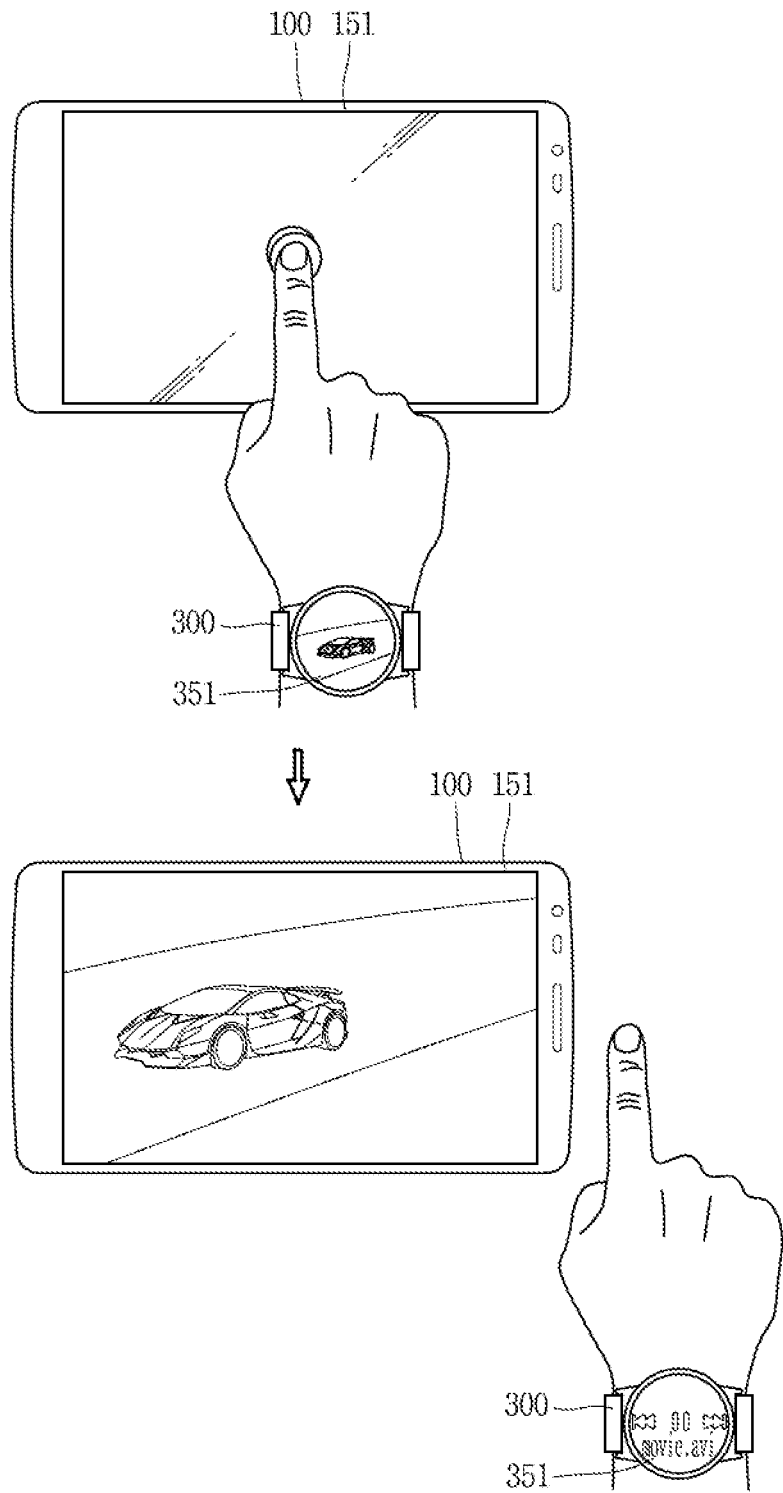

As another example, as illustrated in FIG. 9G, when the main body of the mobile terminal 100 is laid down in the horizontal direction, the mobile terminal 100 continuously displays the content which was being output on the wearable device 300. Further, the wearable device 300 may output the graphic objects associated with the control of the content output on the mobile terminal 100. That is, a device for displaying the content and a device for displaying graphic user interfaces configured to control the content may be distinguished from each other. This allows the user to visually check the content without a portion obscured by the graphic objects.

Figure 9H:
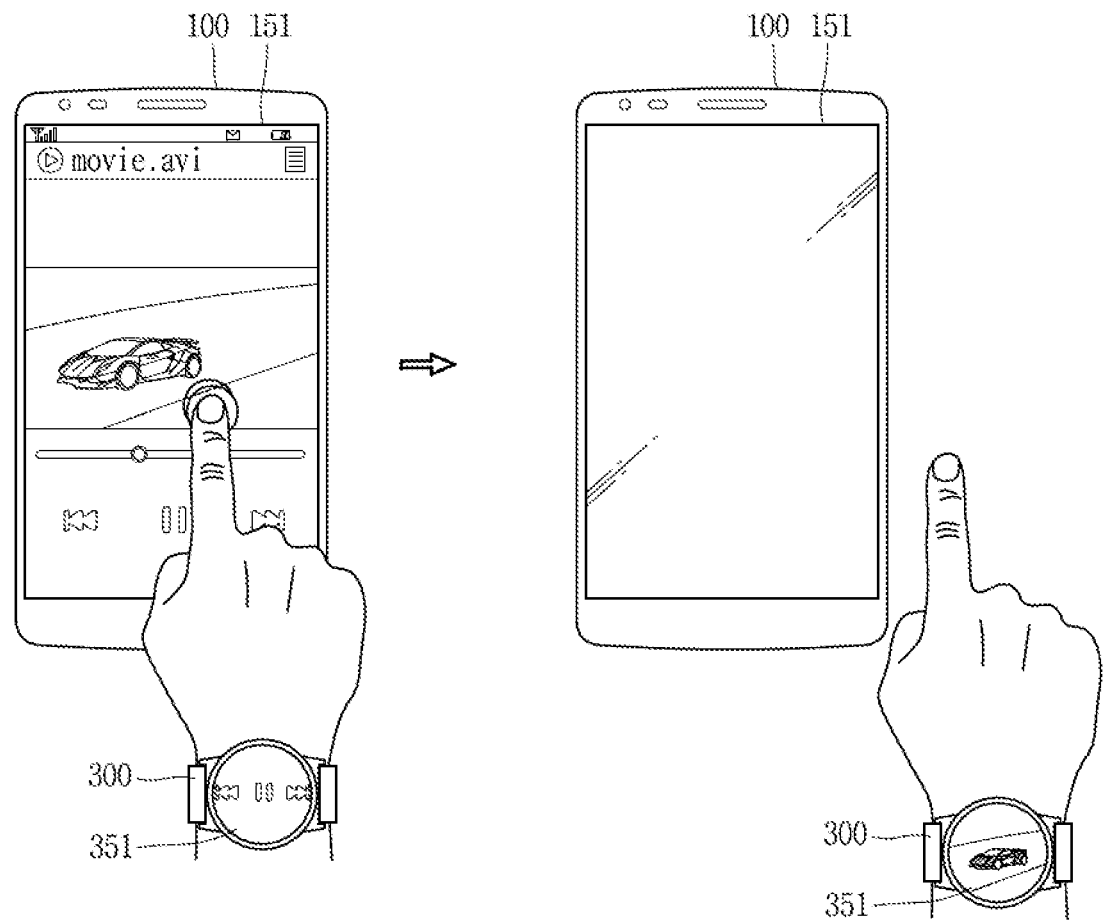

As illustrated in FIG. 9H, even in the activated state of the display unit 151 of the mobile terminal 100, 'the tap input by the main user' may be applied to the mobile terminal 100. Here, the mobile terminal 100 stops the output of information and converts the activated display unit 151 into the deactivated state. The wearable device 300 may then continuously output the information which was being output on the mobile terminal 100.

In such a manner, the mobile terminal 100 according to an embodiment of the present disclosure can execute different types of controls according to the state of the wearable device 300 when 'the tap input by the main user' is applied. The different type of control is a function corresponding to the state of the wearable device 300, namely, a function which the user can recognize the state of the wearable device 300 typically and ideally. This allows the mobile terminal 100 to provide user experiences (UXs) more familiar to the user.

FIG. 10 is a conceptual view illustrating an operation implemented by the mobile terminal and the wearable device in the system according to an embodiment of the present disclosure, which illustrates an execution of a different type of control according to a tap characteristic when 'the tap input by a main user' is applied.

At least one of the mobile terminal 100 and the wearable device 300 may execute a different control according to tap characteristics (or tap attributes) in response to an input of 'the tap input by the main user.' For example, when 'the tap input by the main user' corresponds to a first characteristic, the at least one of the mobile terminal 100 and the wearable device 300 may execute a function set for the first characteristic. When 'the tap input by the main user' corresponds to a second characteristic, the at least one of those devices may execute a function set for the second characteristic.

Here, explaining the tap characteristics, different types of controls may be performed based upon the number of simultaneously applied taps, whether or not the last tap of 'taps meeting the preset condition' continuously comes in contact with the main body, strength of the tap, intensity of the tap, the tap-applied position and the like.

Figure 10A:
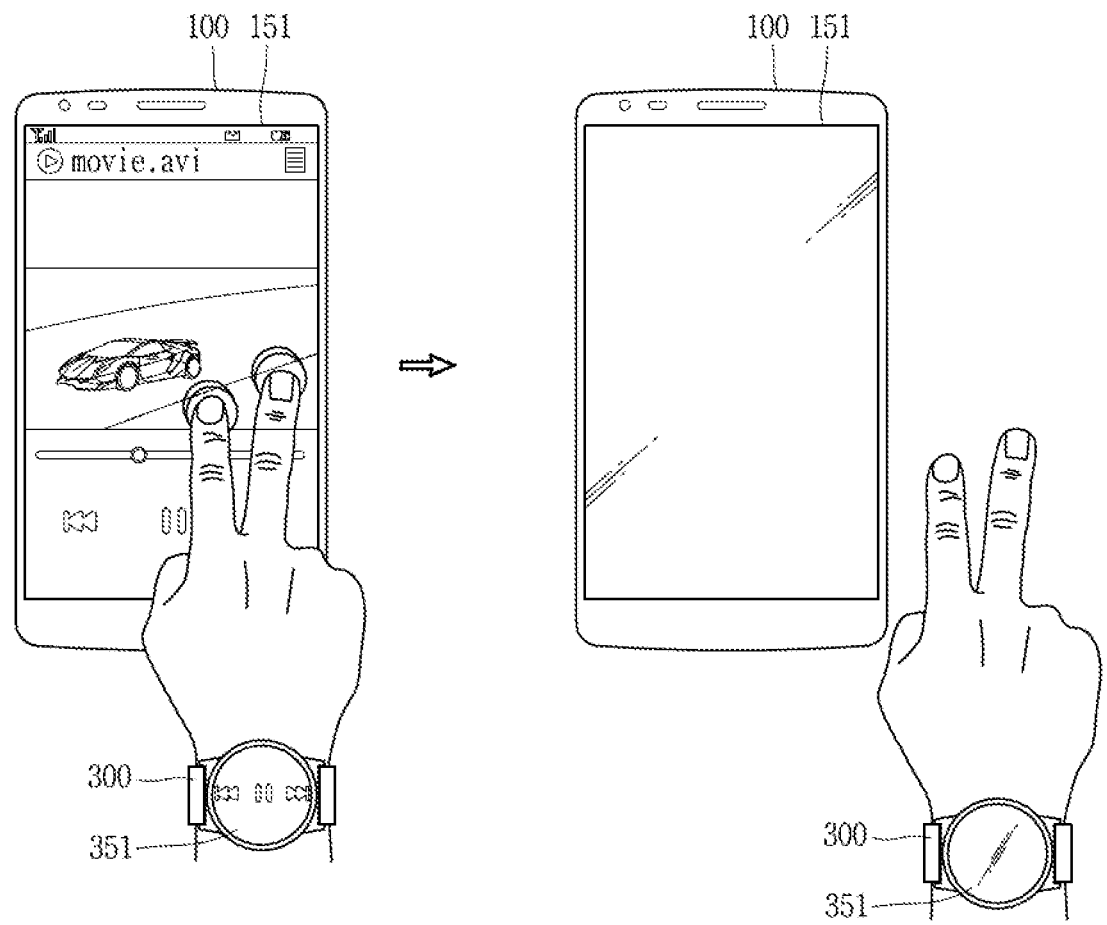
FIGS. 10A to 10E are conceptual views illustrating an operation implemented by a mobile terminal and a wearable device in a system according to an embodiment of the present disclosure, which illustrates an execution of a different type of control according to a tap characteristic when a tap input is applied by a main user.

For example, as illustrated in FIG. 10A, 'the tap input by the main user' may be applied by two fingers. In this example, unlike the example illustrated in FIG. 9H, the mobile terminal 100 and the wearable device 300 stop the output of information being output. That is, the display unit of each device included in the system is converted into the deactivated state. By varying the number of fingers applying 'the tap input by the main user,' the user can selectively turn off the light of at least one of the mobile terminal 100 and the wearable device 300.

Figure 10B:
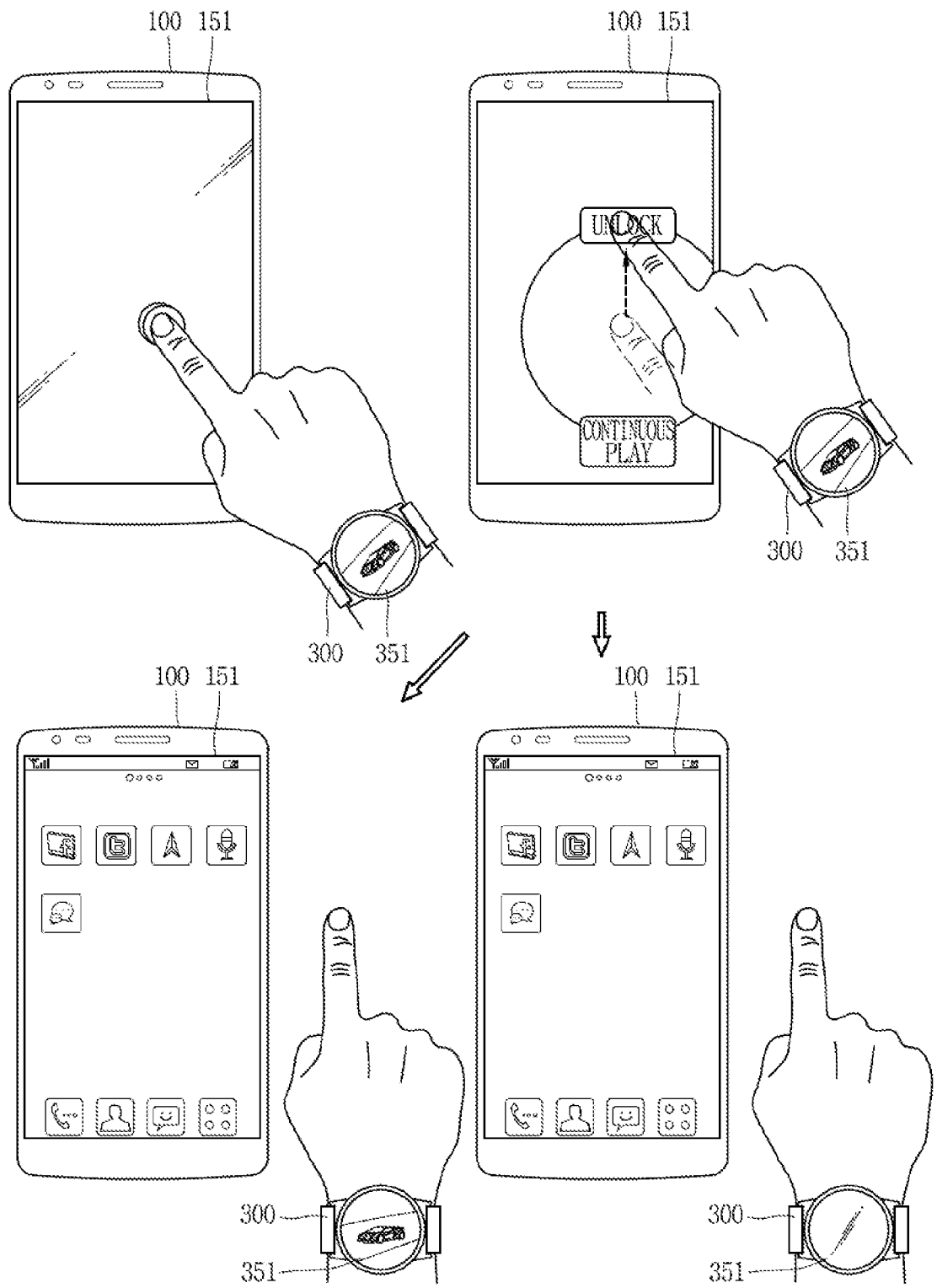

Meanwhile, while 'the tap input by the main user' is applied, the last tap of taps included in 'the tap input by the main user' remains in a contact state with the terminal (this is referred to as 'hold'). Here, as illustrated in FIG. 10B, the mobile terminal 100 releases the lock state and activates at least partial area of the display unit 151. The activated area may vary according to a position where the last tap is sensed, and includes the last tap-sensed position. The mobile terminal 100 displays one or more graphic objects on the at least partial area based on the last tap-sensed position.

The graphic objects may be displayed around the last tap-sensed position of a plurality of taps included in 'the tap input by the main user,' and correspond different functions, respectively. Here, the different functions may include functions executable in the mobile terminal 100. That is, the different function may refer to any type of function which can be executed or run in the mobile terminal 100. For example, the executable function may be an application installed in the mobile terminal 100. Also, the executable function may be a function of converting the lock state of the mobile terminal 100 into the unlock state or a function of outputting a notification panel for displaying an unconfirmed event and the like, namely, a function required for system operations of the mobile terminal 100.

Also, the different function may include a function which is being executed on the wearable device 300. For example, as illustrated in FIG. 10B, the different function may be a function of moving information currently output on the wearable device 300 to the mobile terminal 100 such that the information can be continuously displayed on the mobile terminal 100, or a function of controlling the information currently output on the wearable device 300.

Continuously, the user may select one of the graphic objects displayed on the mobile terminal 100. In more detail, the mobile terminal 100 allows the user to select one of the graphic objects based on a drag input which starts from a position corresponding to the last tap and continuously moves. For example, as illustrated in FIG. 10B, when the drag input started from a touch corresponding to the last tap moves towards a position where a graphic object "unlock" is located, the mobile terminal 100 may decide that a function corresponding to the graphic object, namely, a function linked to the unlock has been selected by the user.

When one of the graphic objects is selected, the mobile terminal 100 executes the selected function, and executes an application corresponding to the selected function. For example, as illustrated in FIG. 10B, when the function linked to the unlock is selected, the lock state may be released and a home screen or an execution screen of the most recently executed function may be displayed on an entire area of the display unit 151.

In addition, when the graphic object linked to the unlock is selected from the graphic objects, the wearable device 300 may continuous output or stop the output of the information which is currently output. Or, a user interface (UI), which is configured for the user to select whether to continuously output or stop the output of the currently output information, may be displayed on the display unit 351 of the wearable device 300. This results from the user's requirements for using the wearable device and the mobile terminal as separate devices.

Meanwhile, the sensing unit 340 of the wearable device 300 may sense whether the user has input a tap by using the whole wrist or only by moving a finger based on a movement of the main body thereof. By identifying this characteristic, the mobile terminal 100 and the wearable device 300 may execute different functions from each other. As one example, while a content is output on the wearable device 300, 'the tap input by the main user' may be applied. When 'the tap input by the main user' is applied in response to the movement of the whole wrist, as illustrated in FIG. 9F, the content which is currently output on the wearable device 300 is continuously output on the mobile terminal 100. The wearable device 300 stops the output of the information and converts the display unit 351 into the deactivated state.

Figure 10C:
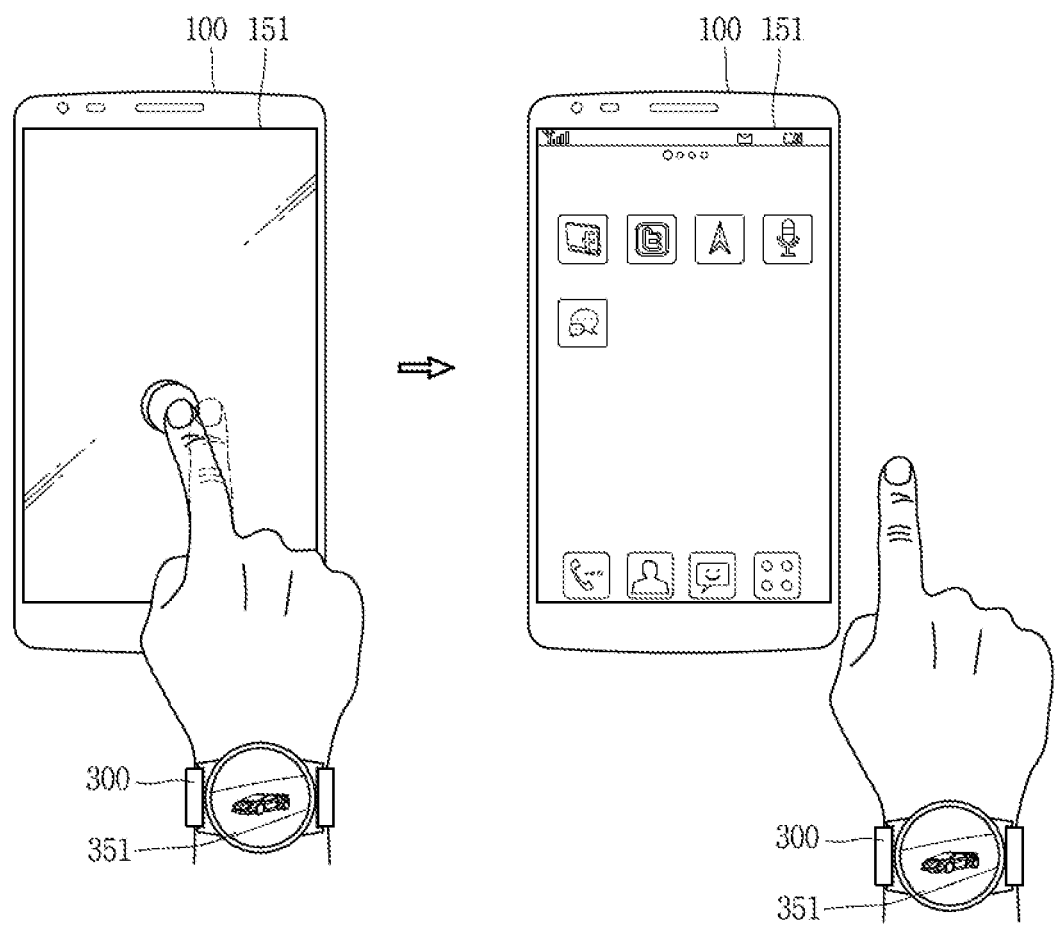

Further, when 'the tap input by the main user' is applied merely in response to the movement of the finger while the wrist is fixed, as illustrated in FIG. 10C, the wearable device 300 continuously outputs the information on the display unit 351. And, the mobile terminal 100 releases the lock state and converts the display unit 151 into the activated state, so as to display a home screen or an execution screen of the most recently executed function. Consequently, the mobile terminal 100 and the wearable device 300 operate, independent of each other.

Figure 10D:
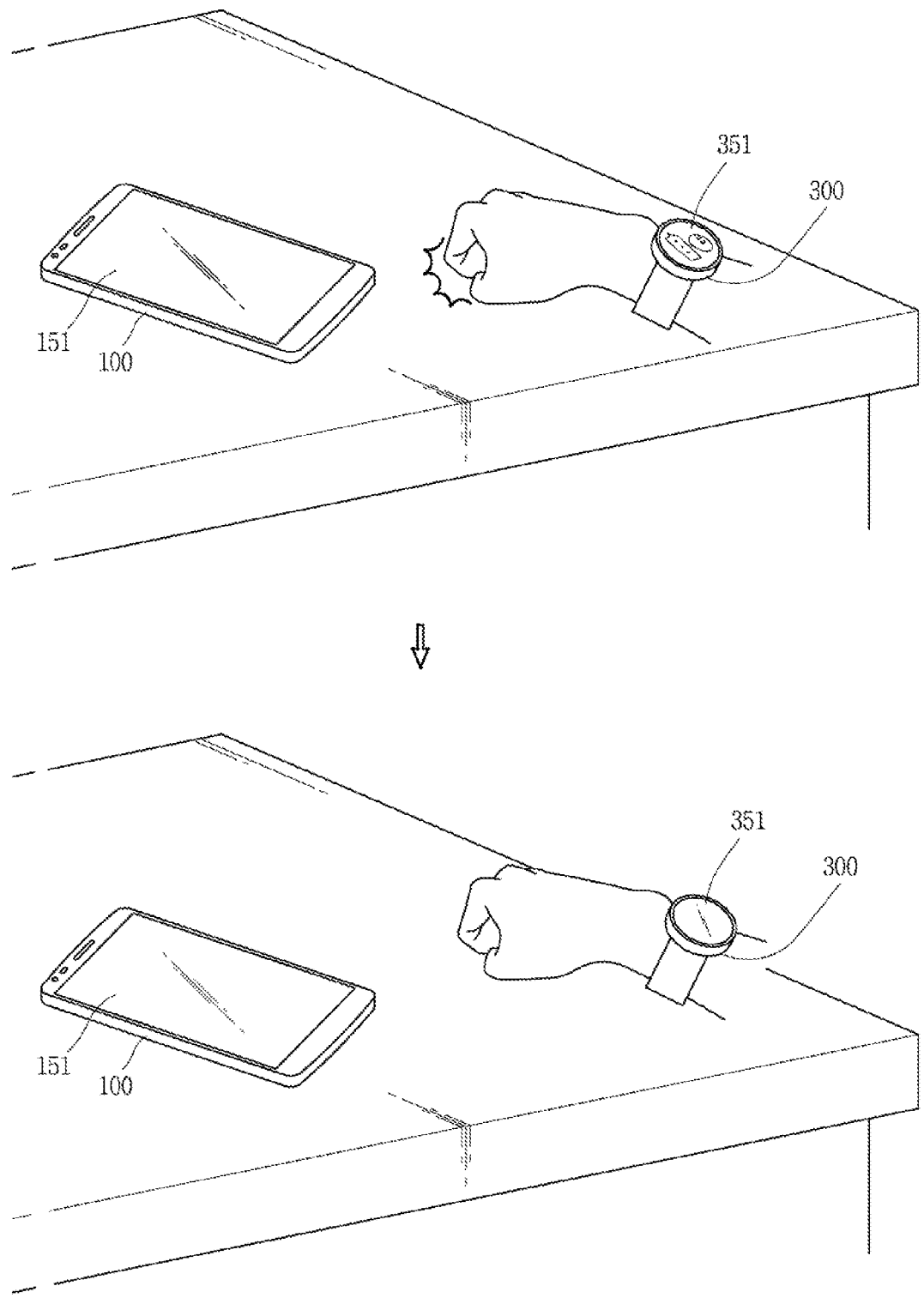
Figure 10E:
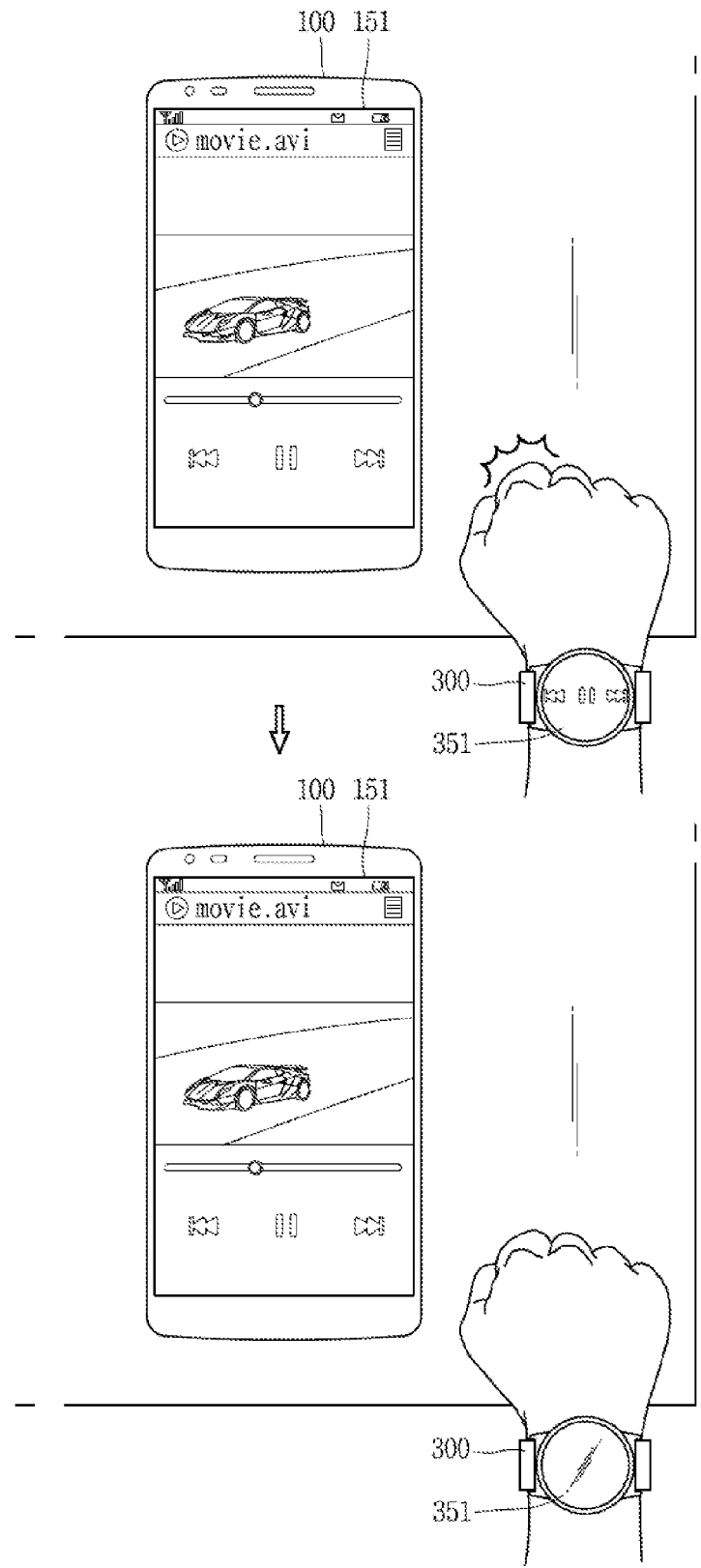

Meanwhile, 'the tap input by the main user' may be applied to an object which is located at a position out of the main body of the mobile terminal 100. In this instance, as illustrated in FIGS. 10D and 10E, the display unit 351 of the wearable device 300 is converted into the deactivated state in response to 'the tap input by the main user.' That is, an output of information which is currently output on the display unit 351 is stopped. Further, the mobile terminal 100 restricts a function from being executed in response to 'the tap input by the main user.' That is, 'the tap input by the main user' is ignored. This is because there is the user's need desiring to control only the wearable device 300.

Figure 11:
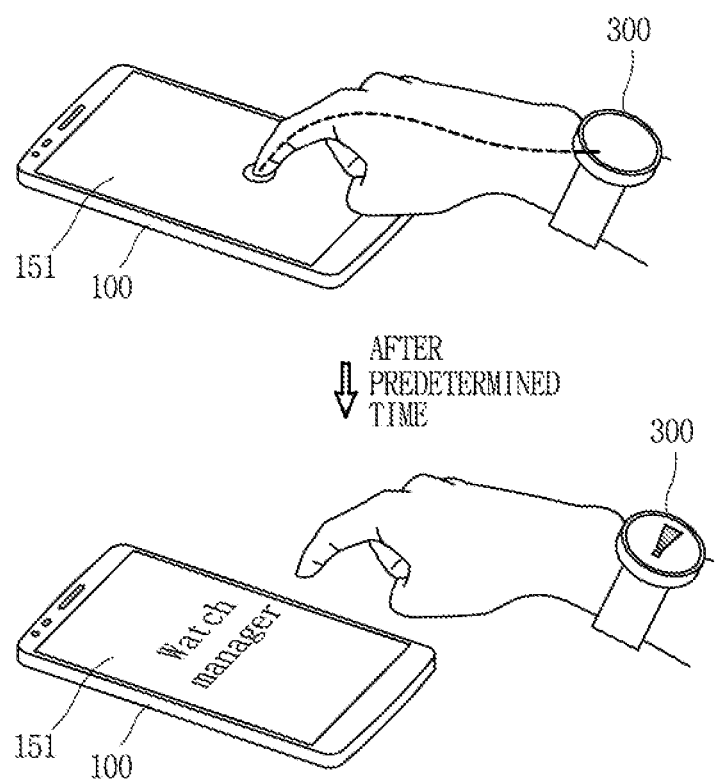
FIG. 11 is a conceptual view illustrating an operation of executing an application associated with a wearable device when electrical conduction is caused for a predetermined time between a mobile terminal and a wearable device.

FIG. 11 is a conceptual view illustrating an operation of executing an application associated with a wearable device when electrical conduction is caused for a predetermined time between a mobile terminal and a wearable device. As aforementioned in FIG. 7, while the user wears the wearable device 300, a gesture of contacting the mobile terminal 100 using the user's body may be sensed. When the electric conductivity is generated between the mobile terminal 100 and the wearable device 300 for a predetermined period of time while the display unit 151 is deactivated, the mobile terminal 100 may output graphic objects, which are provided to change setting values of the wearable device 300, on the display unit 151.

For example, the graphic objects may be various graphic objects, such as an edition of applications installed in the wearable device 300, a turn-on/turn-off of an airplane mode, an edition of a background screen, a text font adjustment, a brightness adjustment and the like. That is, the user can execute 'watch manager' for managing the wearable device 300 by coming in contact with the main body of the mobile terminal for a predetermined period of time using a hand on which the wearable device 300 is worn.

The watch manager may be executed when electric conductivity is generated on a specific area of the display unit 151 for a predetermined time while the display unit 151 is activated, as well as when the electric conductivity is generated for the predetermined time while the display unit 151 is deactivated. Here, while the display unit 151 is activated, another function may be activated by a touch input applied to a graphic object displayed on the display unit 151. Therefore, the specific area is limited to an area where a graphic object linked to a control function is not output. For example, the specific area refers to an empty space of a home screen where any icon or widget is not output.

The foregoing embodiments have illustrated that the lock state of the mobile terminal 100 is released, even without an input of a password, in a manner that the user wearing the wearable device 300 in the unlock state inputs 'the tap meeting the preset condition.' Here, the input of 'the tap meeting the preset condition' is performed to prevent a malfunction of the mobile terminal 100 due to a user-unexpected touch input, namely, prevent the mobile terminal 100 and the wearable device 300 from malfunctioning due to the user's unexpected touch input. 'The tap meeting the present condition' may be changed by different methods. For example, a method in which first and second taps are continuously applied may be changed into a method in which the first tap is applied to a power button configured to power on or off the device.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A system comprising:
a wearable device including a display configured to display a main screen for a main function; and
a mobile terminal including a touch screen, wherein the touch screen includes a touch sensor and a display, wherein the touch screen is configured to have a state conversion between an activated state where the display of the touch screen is on and the touch sensor is on, and a deactivated state where the display of the touch screen is off and the touch sensor is on,
wherein the mobile terminal is configured to:
convert the touch screen from the deactivated state into the activated state when a touch input meeting a preset condition has been input on the touch screen in the deactivated state; and
cause the touch screen to display a first sub screen for a first sub function linked to the main function when the touch input meeting the preset condition has been input by a user wearing the wearable device in which the main screen is displayed, and
wherein the wearable device is configured to cause the display of the wearable device to display a second sub screen for a second sub function linked to the main function, instead of the main screen, when the first sub screen is displayed on the touch screen, and
wherein the touch input meeting a preset condition was whether the user had input the touch input using the entire wrist or by moving at least one finger as sensed by the wearable device.

2. The system of claim 1, wherein the mobile terminal is further configured to release or maintain a lock state of the mobile terminal according to whether or not the touch input meeting the preset condition has been input by the user wearing the wearable device.

3. The system of claim 2, wherein the mobile terminal is further configured to:
release the lock state and display the first sub screen on the touch screen converted into the active state when the touch input meeting the preset condition has been input by the user wearing the wearable device, and maintain the lock state and display a lock screen on the touch screen converted into the active state when the touch input meeting the preset condition has been input by the user not wearing the wearable device, and wherein the lock screen is configured to receive a password for releasing the lock state.

4. The system of claim 3, wherein the mobile terminal is further configured to vary the first sub screen according to information being output on the wearable device when the touch input meeting the preset condition has been input.

5. The system of claim 1, wherein the mobile terminal further comprises a sensor configured to sense whether or not a touch input applied to the touch screen has been input by the user wearing the wearable device.

6. The system of claim 5, wherein the sensor is further configured to sense whether or not the touch input applied to the touch screen has been input by the user wearing the wearable device, based upon a movement of electric charges generated between the mobile terminal and the wearable device when the touch input applied to the touch screen has been input by the user.

7. The system of claim 1, wherein the mobile terminal further comprises a wireless communication unit configured to perform wireless communication with the wearable device, and wherein the mobile terminal is further configured to determine that the touch input meeting the preset condition has been input by the user wearing the wearable device when the mobile terminal receives a notification signal notifying that a preset gesture has been sensed in the wearable device within a predetermined period of time after the input of the touch input meeting the preset condition to the touch screen.

8. The system of claim 1, wherein the mobile terminal is further configured to display a graphic interface to change setting values of the wearable device on the touch screen converted into the active state when the touch input meeting the preset condition is input by the user wearing the wearable device and a last touch generated by the touch input meeting the preset condition is maintained without being released.

9. The system of claim 1, wherein the mobile terminal is further configured to release a lock state of the mobile terminal without requiring an input password when the touch input meeting the preset condition is input by the user wearing the wearable device.

10. The system of claim 1, wherein:
the main function is a function for receiving a message or an email including an attached file,
the first sub function is a function for displaying an execution screen of the attached file, and
the second sub function is a function for displaying contents of the message or the email.

* * * * *